US010949493B2

(12) United States Patent
Kim

(10) Patent No.: US 10,949,493 B2
(45) Date of Patent: Mar. 16, 2021

(54) MULTI-FUNCTIONAL COMPUTING APPARATUS AND FAST FOURIER TRANSFORM COMPUTING APPARATUS

(71) Applicant: Tae Hyoung Kim, Seongnam-si (KR)

(72) Inventor: Tae Hyoung Kim, Seongnam-si (KR)

( * ) Notice: Subject to any disclaimer, the term of this patent is extended or adjusted under 35 U.S.C. 154(b) by 79 days.

(21) Appl. No.: 16/317,886

(22) PCT Filed: Jul. 10, 2017

(86) PCT No.: PCT/KR2017/007358
§ 371 (c)(1),
(2) Date: Jan. 15, 2019

(87) PCT Pub. No.: WO2018/012828
PCT Pub. Date: Jan. 18, 2018

(65) Prior Publication Data
US 2019/0294650 A1    Sep. 26, 2019

(30) Foreign Application Priority Data

Jul. 13, 2016   (KR) .................. 10-2016-0088659
Nov. 23, 2016   (KR) .................. 10-2016-0156445

(51) Int. Cl.
G06F 17/14     (2006.01)
G06F 9/30      (2018.01)
G06F 12/02     (2006.01)

(52) U.S. Cl.
CPC ............ *G06F 17/142* (2013.01); *G06F 9/30* (2013.01); *G06F 9/3001* (2013.01);
(Continued)

(58) Field of Classification Search
CPC .............................. G06F 17/14; G06F 17/142
See application file for complete search history.

(56) References Cited

U.S. PATENT DOCUMENTS

| | | | |
|---|---|---|---|
| 8,812,819 B1 * | 8/2014 | Langhammer | G06F 17/142 |
| | | | 711/103 |
| 2003/0088601 A1 * | 5/2003 | Pitsianis | G06F 9/30014 |
| | | | 708/622 |

(Continued)

FOREIGN PATENT DOCUMENTS

| | | |
|---|---|---|
| JP | S59-205669 A | 11/1984 |
| JP | 2001-022577 A | 1/2001 |

(Continued)

OTHER PUBLICATIONS

International Search Report for PCT/KR2017/007358 dated Oct. 23, 2017 from Korean Intellectual Property Office.

(Continued)

*Primary Examiner* — Chuong D Ngo
(74) *Attorney, Agent, or Firm* — Paratus Law Group, PLLC

(57) ABSTRACT

Provided is a multi-functional computing apparatus including a multiply-accumulate (MAC) unit having a plurality of MAC circuits, an address generator configured to generate a read address group having a plurality of read addresses, and a memory having a plurality of banks for storing a plurality of read data groups, wherein the address generator delivers the generated read address group to the memory, and the memory delivers a read data group corresponding to the read address group selected from among the plurality of read data groups, the read data group including a plurality of pieces of read data.

4 Claims, 23 Drawing Sheets

(52) U.S. Cl.
CPC .......... G06F 9/30043 (2013.01); G06F 12/02 (2013.01); G06F 12/0215 (2013.01); G06F 17/14 (2013.01)

(56) References Cited

U.S. PATENT DOCUMENTS

2004/0181503 A1* 9/2004 Moseler .............. G06F 16/2228
2015/0331634 A1* 11/2015 Salishchev ............ G06F 3/0613
711/149

FOREIGN PATENT DOCUMENTS

| KR | 10-0835173 B1 | 6/2008 |
|----|---------------|--------|
| KR | 10-0940465 B1 | 2/2010 |
| KR | 10-2011-0090915 A | 8/2011 |
| KR | 10-2016-0072620 A | 6/2016 |

OTHER PUBLICATIONS

Korean Notice of Allowance for related KR Application No. 10-2016-0088659 dated Jul. 31, 2017 from Korean Intellectual Property Office.

Korean Notice of Allowance for related KR Application No. 10-2016-0156445 dated Mar. 8, 2018 from Korean Intellectual Property Office.

* cited by examiner $x1 = x1[R] + jx1[I]$ → $y1 = x1 + x2w$
$= x1[R] + x2[R]w[R] - x2[I]w[I]$
$+ j(x1[I] + x2[R]w[I] + x2[I]w[R])$ $x2 = x2[R] + jx2[I]$ —(×)— —(×)— → $y2 = x1 - x2w$
$\quad\quad\quad\quad\quad\quad\quad\quad -1 \quad\quad = x1[R] - x2[R]w[R] + x2[I]w[I]$
$\quad\quad\quad\quad w = w[R] + jw[I] \quad\quad + j(x1[I] - x2[R]w[I] - x2[I]w[R])$

FIG. 7

| Cycle | XA1 | XA2 | XA3 | XA4 |
|---|---|---|---|---|
| 1 | 1 | 2 | 3 | 4 |
| 2 | 7 | 8 | 9 | 10 |
| 3 | 13 | 14 | 15 | 16 |
| 4 | 19 | 20 | 21 | 22 |
| 5 | 1 | 2 | 3 | 4 |
| 6 | 7 | 8 | 9 | 10 |
| 7 | 13 | 14 | 15 | 16 |
| 8 | 19 | 20 | 21 | 22 |
| 9 | 1 | 2 | 9 | 10 |
| 10 | 7 | 8 | 3 | 4 |
| 11 | 19 | 20 | 15 | 16 |
| 12 | 13 | 14 | 21 | 22 |
| 13 | 1 | 2 | 15 | 16 |
| 14 | 13 | 14 | 3 | 4 |
| 15 | 19 | 20 | 9 | 10 |
| 16 | 7 | 8 | 21 | 22 |

FIG. 8

| Cycle | W1 | W2 |
|---|---|---|
| 1 | 5 | NA |
| 2 | 5 | NA |
| 3 | 5 | NA |
| 4 | 5 | NA |
| 5 | 5 | 18 |
| 6 | 5 | 18 |
| 7 | 5 | 18 |
| 8 | 5 | 18 |
| 9 | 5 | 12 |
| 10 | 23 | 18 |
| 11 | 5 | 12 |
| 12 | 23 | 18 |
| 13 | 5 | 6 |
| 14 | 11 | 12 |
| 15 | 17 | 18 |
| 16 | 23 | 24 |

FIG. 9

| Cycle | Min1 | Min2 | Min3 | Min4 | Min5 | Min6 | Min7 | Min8 | Min9 | Min10 | Min11 | Min12 | Min13 | Min14 | Min15 | Min16 | Min17 | Min18 | Min19 | Min20 |
|---|---|---|---|---|---|---|---|---|---|---|---|---|---|---|---|---|---|---|---|---|
| 1 | X2[R] | W1[R] | X2[I] | W1[I] | X2[R] | W1[I] | X2[I] | W1[R] | X1[R] | X1[I] | X4[I] | W1[R] | X4[I] | W1[I] | X4[R] | W1[I] | X4[I] | W1[R] | X3[R] | X3[I] |
| 2 | X4[R] | W1[R] | X4[I] | W1[I] | X4[R] | W1[I] | X4[I] | W1[R] | X3[R] | X3[I] | X2[I] | W1[R] | X2[I] | W1[I] | X2[R] | W1[I] | X2[I] | W1[R] | X1[R] | X1[I] |
| 3 | X4[R] | W1[R] | X4[I] | W1[I] | X4[R] | W1[I] | X4[I] | W1[R] | X3[R] | X3[I] | X4[I] | W1[R] | X4[I] | W1[I] | X4[R] | W1[I] | X4[I] | W1[R] | X1[R] | X1[I] |
| 4 | X2[R] | W1[R] | X2[I] | W1[I] | X2[R] | W1[I] | X2[I] | W1[R] | X1[R] | X1[I] | X4[I] | W1[R] | X4[I] | W1[I] | X4[R] | W1[I] | X4[I] | W1[R] | X3[R] | X3[I] |
| 5 | X3[R] | W1[R] | X3[I] | W1[I] | X3[R] | W1[I] | X3[I] | W1[R] | X1[R] | X1[I] | X2[I] | W1[R] | X2[I] | W1[I] | X2[R] | W1[I] | X2[I] | W1[R] | X3[R] | X3[I] |
| 6 | X1[R] | W1[R] | X1[I] | W1[I] | X1[R] | W1[I] | X1[I] | W1[R] | X3[R] | X3[I] | X4[I] | W1[R] | X4[I] | W1[I] | X4[R] | W1[I] | X4[I] | W1[R] | X2[R] | X2[I] |
| 7 | X1[R] | W1[R] | X1[I] | W1[I] | X1[R] | W1[I] | X1[I] | W1[R] | X3[R] | X3[I] | X2[I] | W1[R] | X2[I] | W1[I] | X2[R] | W1[I] | X2[I] | W1[R] | X4[R] | X4[I] |
| 8 | X3[R] | W1[R] | X3[I] | W1[I] | X3[R] | W1[I] | X3[I] | W1[R] | X1[R] | X1[I] | X4[I] | W1[R] | X4[I] | W1[I] | X4[R] | W2[I] | X4[I] | W2[R] | X2[R] | X2[I] |
| 9 | X3[R] | W1[R] | X3[I] | W2[I] | X3[R] | W2[I] | X3[I] | W2[R] | X1[R] | X1[I] | X2[I] | W2[R] | X2[I] | W2[I] | X2[R] | W2[I] | X2[I] | W2[R] | X4[R] | X4[I] |
| 10 | X1[R] | W2[R] | X1[I] | W2[I] | X1[R] | W2[I] | X1[I] | W2[R] | X3[R] | X3[I] | X4[I] | W2[R] | X4[I] | W2[I] | X4[R] | W2[I] | X4[I] | W1[R] | X2[R] | X2[I] |
| 11 | X1[R] | W1[R] | X1[I] | W1[I] | X1[R] | W1[I] | X1[I] | W2[R] | X3[R] | X3[I] | X2[I] | W1[R] | X2[I] | W1[I] | X2[R] | W1[I] | X2[I] | W2[R] | X4[R] | X4[I] |
| 12 | X3[R] | W2[R] | X3[I] | W2[I] | X3[R] | W2[I] | X3[I] | W1[R] | X1[R] | X1[I] | X4[I] | W2[R] | X4[I] | W2[I] | X4[R] | W2[I] | X4[I] | W2[R] | X2[R] | X2[I] |
| 13 | X3[R] | W2[R] | X3[I] | W2[I] | X3[R] | W2[I] | X3[I] | W2[R] | X1[R] | X1[I] | X2[I] | W2[R] | X2[I] | W2[I] | X2[R] | W1[I] | X2[I] | W1[R] | X4[R] | X4[I] |
| 14 | X1[R] | W2[R] | X1[I] | W2[I] | X1[R] | W2[I] | X1[I] | W2[R] | X3[R] | X3[I] | X4[I] | W2[R] | X4[I] | W2[I] | X4[R] | W1[I] | X4[I] | W1[R] | X2[R] | X2[I] |
| 15 | X1[R] | W1[R] | X1[I] | W2[I] | X1[R] | W2[I] | X1[I] | W1[R] | X3[R] | X3[I] | X2[I] | W1[R] | X2[I] | W2[I] | X2[R] | W2[I] | X2[I] | W1[R] | X4[R] | X4[I] |
| 16 | X3[R] | W1[R] | X3[I] | W1[I] | X3[R] | W1[I] | X3[I] | W1[R] | X1[R] | X1[I] | X4[I] | W1[R] | X4[I] | W1[I] | X4[R] | W2[I] | X4[I] | W2[R] | X2[R] | X2[I] |

FIG. 10

| Cycle | Mout1 | Mout2 | Mout3 | Mout4 | Mout5 | Mout6 | Mout7 | Mout8 |
|---|---|---|---|---|---|---|---|---|
| 1 | Y1[R] | Y2[R] | Y1[I] | Y2[I] | Y3[R] | Y4[R] | Y3[I] | Y4[I] |
| 2 | Y3[R] | Y4[R] | Y3[I] | Y4[I] | Y1[R] | Y2[R] | Y1[I] | Y2[I] |
| 3 | Y3[R] | Y4[R] | Y3[I] | Y4[I] | Y1[R] | Y2[R] | Y1[I] | Y2[I] |
| 4 | Y1[R] | Y2[R] | Y1[I] | Y2[I] | Y3[R] | Y4[R] | Y3[I] | Y4[I] |
| 5 | Y1[R] | Y3[R] | Y1[I] | Y3[I] | Y2[R] | Y4[R] | Y2[I] | Y4[I] |
| 6 | Y3[R] | Y1[R] | Y3[I] | Y1[I] | Y4[R] | Y2[R] | Y4[I] | Y2[I] |
| 7 | Y3[R] | Y1[R] | Y3[I] | Y1[I] | Y4[R] | Y2[R] | Y4[I] | Y2[I] |
| 8 | Y1[R] | Y3[R] | Y1[I] | Y3[I] | Y2[R] | Y4[R] | Y2[I] | Y4[I] |
| 9 | Y1[R] | Y3[R] | Y1[I] | Y3[I] | Y2[R] | Y4[R] | Y2[I] | Y4[I] |
| 10 | Y3[R] | Y1[R] | Y3[I] | Y1[I] | Y4[R] | Y2[R] | Y4[I] | Y2[I] |
| 11 | Y3[R] | Y1[R] | Y3[I] | Y1[I] | Y4[R] | Y2[R] | Y4[I] | Y2[I] |
| 12 | Y1[R] | Y3[R] | Y1[I] | Y3[I] | Y2[R] | Y4[R] | Y2[I] | Y4[I] |
| 13 | Y1[R] | Y3[R] | Y1[I] | Y3[I] | Y2[R] | Y4[R] | Y2[I] | Y4[I] |
| 14 | Y3[R] | Y1[R] | Y3[I] | Y1[I] | Y4[R] | Y2[R] | Y4[I] | Y2[I] |
| 15 | Y3[R] | Y1[R] | Y3[I] | Y1[I] | Y4[R] | Y2[R] | Y4[I] | Y2[I] |
| 16 | Y1[R] | Y3[R] | Y1[I] | Y3[I] | Y2[R] | Y4[R] | Y2[I] | Y4[I] |

FIG. 21

| Cycle | XA1 | XA2 | XA3 | XA4 |
|---|---|---|---|---|
| 1 | 1 | 2 | 3 | 4 |
| 2 | 7 | 8 | 9 | 10 |
| 3 | 13 | 14 | 15 | 16 |
| 4 | 19 | 20 | 21 | 22 |
| 5 | 1 | 2 | 3 | 4 |
| 6 | 7 | 8 | 9 | 10 |
| 7 | 13 | 14 | 15 | 16 |
| 8 | 19 | 20 | 21 | 22 |
| 9 | 1 | 2 | 9 | 10 |
| 10 | 7 | 8 | 3 | 4 |
| 11 | 19 | 20 | 15 | 16 |
| 12 | 13 | 14 | 21 | 22 |
| 13 | 1 | 2 | 15 | 16 |
| 14 | 13 | 14 | 3 | 4 |
| 15 | 19 | 20 | 9 | 10 |
| 16 | 7 | 8 | 21 | 22 |

FIG. 22

| Cycle | W1 | W2 |
|---|---|---|
| 1 | 5 | NA |
| 2 | 5 | NA |
| 3 | 5 | NA |
| 4 | 5 | NA |
| 5 | 5 | 18 |
| 6 | 5 | 18 |
| 7 | 5 | 18 |
| 8 | 5 | 18 |
| 9 | 5 | 12 |
| 10 | 23 | 18 |
| 11 | 5 | 12 |
| 12 | 23 | 18 |
| 13 | 5 | 6 |
| 14 | 11 | 12 |
| 15 | 17 | 18 |
| 16 | 23 | 24 |

FIG. 23

| Cycle | Min1 | Min2 | Min3 | Min4 | Min5 | Min6 | Min7 | Min8 | Min9 | Min10 | Min11 | Min12 | Min13 | Min14 | Min15 | Min16 | Min17 | Min18 | Min19 | Min20 |
|---|---|---|---|---|---|---|---|---|---|---|---|---|---|---|---|---|---|---|---|---|
| 1 | X2[R] | W1[R] | X2[I] | W1[I] | X2[R] | W1[I] | X2[I] | W1[R] | X1[R] | X1[I] | X4[R] | W1[R] | X4[I] | W1[I] | X4[R] | W1[I] | X4[I] | W1[R] | X3[R] | X3[I] |
| 2 | X4[R] | W1[R] | X4[I] | W1[I] | X4[R] | W1[I] | X4[I] | W1[R] | X3[R] | X3[I] | X2[R] | W1[R] | X2[I] | W1[I] | X2[R] | W1[I] | X2[I] | W1[R] | X1[R] | X1[I] |
| 3 | X4[R] | W1[R] | X4[I] | W1[I] | X4[R] | W1[I] | X4[I] | W1[R] | X3[R] | X3[I] | X2[R] | W1[R] | X2[I] | W1[I] | X2[R] | W1[I] | X2[I] | W1[R] | X1[R] | X1[I] |
| 4 | X2[R] | W1[R] | X2[I] | W1[I] | X2[R] | W1[I] | X2[I] | W1[R] | X1[R] | X1[I] | X4[R] | W1[R] | X4[I] | W1[I] | X4[R] | W1[I] | X4[I] | W1[R] | X3[R] | X3[I] |
| 5 | X3[R] | W1[R] | X3[I] | W1[I] | X3[R] | W1[I] | X3[I] | W1[R] | X1[R] | X1[I] | X4[R] | W1[R] | X4[I] | W1[I] | X4[R] | W1[I] | X4[I] | W1[R] | X2[R] | X2[I] |
| 6 | X1[R] | W1[R] | X1[I] | W1[I] | X1[R] | W1[I] | X1[I] | W1[R] | X3[R] | X3[I] | X2[R] | W1[R] | X2[I] | W1[I] | X2[R] | W1[I] | X2[I] | W1[R] | X4[R] | X4[I] |
| 7 | X1[R] | W1[R] | X1[I] | W1[I] | X1[R] | W1[I] | X1[I] | W1[R] | X3[R] | X3[I] | X2[R] | W1[R] | X2[I] | W1[I] | X2[R] | W1[I] | X2[I] | W1[R] | X4[R] | X4[I] |
| 8 | X3[R] | W1[R] | X3[I] | W1[I] | X3[R] | W1[I] | X3[I] | W1[R] | X1[R] | X1[I] | X4[R] | W1[R] | X4[I] | W1[I] | X4[R] | W1[I] | X4[I] | W1[R] | X2[R] | X2[I] |
| 9 | X3[R] | W2[R] | X3[I] | W2[I] | X3[R] | W2[I] | X3[I] | W2[R] | X1[R] | X1[I] | X4[R] | W2[R] | X4[I] | W2[I] | X4[R] | W2[I] | X4[I] | W2[R] | X2[R] | X2[I] |
| 10 | X1[R] | W2[R] | X1[I] | W2[I] | X1[R] | W2[I] | X1[I] | W2[R] | X3[R] | X3[I] | X2[R] | W2[R] | X2[I] | W2[I] | X2[R] | W2[I] | X2[I] | W2[R] | X4[R] | X4[I] |
| 11 | X1[R] | W2[R] | X1[I] | W2[I] | X1[R] | W2[I] | X1[I] | W2[R] | X3[R] | X3[I] | X2[R] | W2[R] | X2[I] | W2[I] | X2[R] | W2[I] | X2[I] | W2[R] | X4[R] | X4[I] |
| 12 | X3[R] | W2[R] | X3[I] | W2[I] | X3[R] | W2[I] | X3[I] | W2[R] | X1[R] | X1[I] | X4[R] | W2[R] | X4[I] | W2[I] | X4[R] | W2[I] | X4[I] | W2[R] | X2[R] | X2[I] |
| 13 | X3[R] | W2[R] | X3[I] | W2[I] | X3[R] | W2[I] | X3[I] | W2[R] | X1[R] | X1[I] | X4[R] | W1[R] | X4[I] | W1[I] | X4[R] | W1[I] | X4[I] | W1[R] | X2[R] | X2[I] |
| 14 | X1[R] | W2[R] | X1[I] | W2[I] | X1[R] | W2[I] | X1[I] | W2[R] | X3[R] | X3[I] | X2[R] | W1[R] | X2[I] | W1[I] | X2[R] | W1[I] | X2[I] | W1[R] | X4[R] | X4[I] |
| 15 | X1[R] | W1[R] | X1[I] | W1[I] | X1[R] | W1[I] | X1[I] | W1[R] | X3[R] | X3[I] | X2[R] | W2[R] | X2[I] | W2[I] | X2[R] | W2[I] | X2[I] | W2[R] | X4[R] | X4[I] |
| 16 | X3[R] | W1[R] | X3[I] | W1[I] | X3[R] | W1[I] | X3[I] | W1[R] | X1[R] | X1[I] | X4[R] | W2[R] | X4[I] | W2[I] | X4[R] | W2[I] | X4[I] | W2[R] | X2[R] | X2[I] |

FIG. 24

| Cycle | Mout1 | Mout2 | Mout3 | Mout4 | Mout5 | Mout6 | Mout7 | Mout8 |
|---|---|---|---|---|---|---|---|---|
| 1 | Y1[R] | Y2[R] | Y1[I] | Y2[I] | Y3[R] | Y4[R] | Y3[I] | Y4[I] |
| 2 | Y3[R] | Y4[R] | Y3[I] | Y4[I] | Y1[R] | Y2[R] | Y1[I] | Y2[I] |
| 3 | Y3[R] | Y4[R] | Y3[I] | Y4[I] | Y1[R] | Y2[R] | Y1[I] | Y2[I] |
| 4 | Y1[R] | Y2[R] | Y1[I] | Y2[I] | Y3[R] | Y4[R] | Y3[I] | Y4[I] |
| 5 | Y1[R] | Y3[R] | Y1[I] | Y3[I] | Y2[R] | Y4[R] | Y2[I] | Y4[I] |
| 6 | Y3[R] | Y1[R] | Y3[I] | Y1[I] | Y4[R] | Y2[R] | Y4[I] | Y2[I] |
| 7 | Y3[R] | Y1[R] | Y3[I] | Y1[I] | Y4[R] | Y2[R] | Y4[I] | Y2[I] |
| 8 | Y1[R] | Y3[R] | Y1[I] | Y3[I] | Y2[R] | Y4[R] | Y2[I] | Y4[I] |
| 9 | Y1[R] | Y3[R] | Y1[I] | Y3[I] | Y4[R] | Y2[R] | Y4[I] | Y2[I] |
| 10 | Y3[R] | Y1[R] | Y3[I] | Y1[I] | Y2[R] | Y4[R] | Y2[I] | Y4[I] |
| 11 | Y3[R] | Y1[R] | Y3[I] | Y1[I] | Y2[R] | Y4[R] | Y2[I] | Y4[I] |
| 12 | Y1[R] | Y3[R] | Y1[I] | Y3[I] | Y4[R] | Y2[R] | Y4[I] | Y2[I] |
| 13 | Y1[R] | Y3[R] | Y1[I] | Y3[I] | Y2[R] | Y4[R] | Y2[I] | Y4[I] |
| 14 | Y3[R] | Y1[R] | Y3[I] | Y1[I] | Y4[R] | Y2[R] | Y4[I] | Y2[I] |
| 15 | Y3[R] | Y1[R] | Y3[I] | Y1[I] | Y4[R] | Y2[R] | Y4[I] | Y2[I] |
| 16 | Y1[R] | Y3[R] | Y1[I] | Y3[I] | Y2[R] | Y4[R] | Y2[I] | Y4[I] |

MULTI-FUNCTIONAL COMPUTING APPARATUS AND FAST FOURIER TRANSFORM COMPUTING APPARATUS

CROSS REFERENCE TO PRIOR APPLICATIONS

This application is a National Stage Patent Application of PCT International Patent Application No. PCT/KR2017/007358 filed on Jul. 10, 2017 under 35 U.S.C. § 371, which claims priority to Korean Patent Application Nos. 10-2016-0088659 filed on Jul. 13, 2016 and 10-2016-0156445 filed on Nov. 23, 2016, which are all hereby incorporated by reference in their entirety.

BACKGROUND

1. Field of the Invention

The following description relates to a multi-functional computing apparatus and a fast Fourier transform (FFT) computing apparatus.

2. Discussion of Related Art

A multiply-accumulate (MAC) circuit has a multiplier and an accumulator connected to an output of the multiplier. A MAC circuit is used for various applications such as a finite impulse response filter (FIR filter), an infinite impulse response filter (IIR filter), a fast Fourier transform (FFT), and an inverse Fourier transform (IFFT). MAC circuits were initially applied to digital signal processors (DSPs), but currently they are also commonly applied to general purpose processors (GPPs).

A conventional multi-MAC technique using a plurality of MACs in parallel is disclosed in Korean Patent No. 10-0835173 entitled "Apparatus and Method for Multiply-and-Accumulate operations in digital signal processing." According to the conventional technique, a controller should call instructions from a program memory every clock cycle and transfer the instructions to a data address generator. This assigns a great deal of load to the controller and lowers the efficiency of the whole system.

SUMMARY OF THE INVENTION

The present disclosure, which addresses the problems of the related art, provides a multi-functional computing apparatus and a fast Fourier transform (FFT) computing apparatus in which a controller does not need to call instructions from a program memory every clock cycle.

Also, the present disclosure provides a multi-functional computing apparatus and an FFT computing apparatus capable of minimizing capacity of a used memory while using a plurality of multiply-accumulate (MAC) circuits.

According to an aspect of the present invention, there is a multi-functional computing apparatus including a MAC unit having a plurality of MAC circuits, an address generator configured to generate a read address group having a plurality of read addresses, and a memory having a plurality of banks for storing a plurality of read data groups, wherein the address generator delivers the generated read address group to the memory, and the memory delivers a read data group corresponding to the read address group selected from among the plurality of read data groups, the read data group including a plurality of pieces of read data.

According to another aspect of the present invention, there is provided a fast Fourier transform (FFT) computing apparatus including a multiplication unit having a plurality of multiply circuits, an address generator configured to generate a read address group having a plurality of read addresses, and a memory having a plurality of banks for storing a plurality of read data groups, wherein the address generator delivers the generated read address group to the memory, and the memory delivers a read data group corresponding to the read address group selected from among the plurality of read data groups to the multiplication unit, the read data group including a plurality of pieces of read data.

BRIEF DESCRIPTION OF THE DRAWINGS

The above and other objects, features and advantages of the present invention will become more apparent to those of ordinary skill in the art by describing exemplary embodiments thereof in detail with reference to the accompanying drawings, in which:

FIGS. 2 to 10 are diagrams for describing operation when the multi-functional computing apparatus shown in FIG. 1 has eight MACS and performs a 16-point fast Fourier transform (FFT) computation;

FIGS. 16 to 24 are diagrams for describing operation when the FFT computing apparatus shown in FIG. 15 has eight multiply circuits and performs a 16-point FFT computation.

DETAILED DESCRIPTION OF EXEMPLARY EMBODIMENTS

Specific embodiments will be shown in the accompanying drawings and described in detail below because the following description may be variously modified and have several example embodiments. It should be understood, however, that there is no intent to limit the following description to the particular forms disclosed, but on the contrary, the invention is to cover all modifications, equivalents, and alternatives falling within the spirit and scope of the following description.

In addition, the terms such as "first," "second," "A," and "B" may be used to describe various elements, but these elements are not limited by theses terms. These terms are used to only distinguish one element from another element. For example, a first element may be called a second element, and a second element may also be called a first element without departing from the scope of the following description. The term "and/or" means any one or a combination of a plurality of related items.

It should be understood that singular forms are intended to include plural forms unless the context clearly indicates otherwise, and it should be further understood that the terms "comprise," "include," or "have" as used herein specify the presence of stated features, numerals, steps, operations, elements, components, or a combination thereof, but do not preclude the presence or addition of one or more other features, numerals, steps, operations, elements, components, or combinations thereof.

Prior to a detailed description of the drawings, it should be clarified that division of components in the present specification is performed only based on main functions performed by the respective components. That is, two or more components which will be described later may be integrated into a single component or, alternatively, a single component may be divided into two or more components depending on subdivided functions. Further, it is apparent that each of the components, which will be described later, may additionally perform some or all of functions performed by other components in addition to main functions performed thereby, and some of the main functions performed by the respective components may be shared with other components and performed.

In addition, the respective steps of the above method may be performed in a sequence different from a described sequence unless the context clearly defines a specific sequence. That is, the respective steps may be performed in the same sequence as the described sequence, at substantially the same time, or in an opposite sequence to the described sequence.

Figure 1:
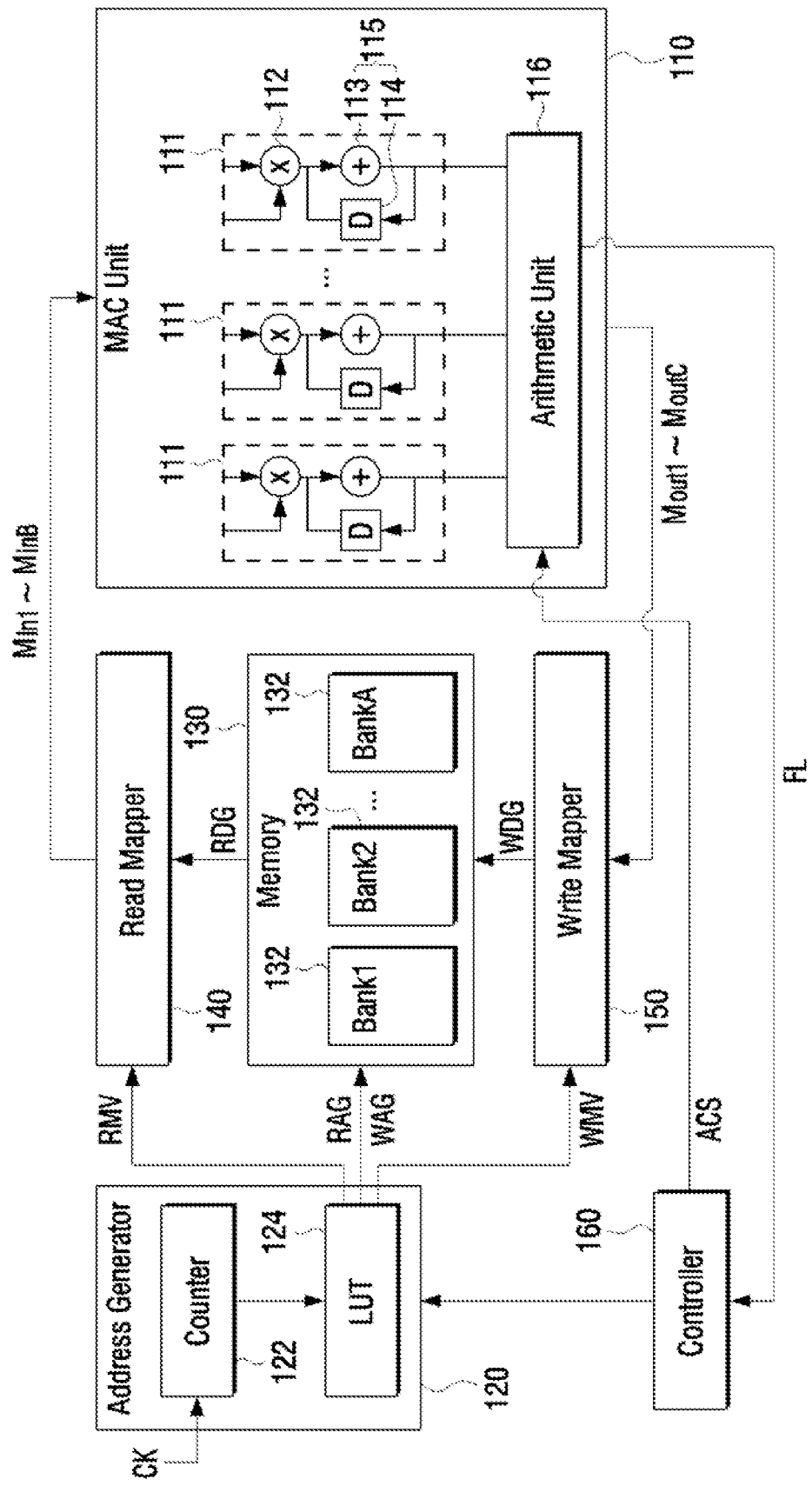
FIG. 1 is a diagram showing a multi-functional computing apparatus according to an embodiment.

FIG. 1 is a diagram showing a multi-functional computing apparatus according to an embodiment. Referring to FIG. 1, the multi-functional computing apparatus includes an MAC unit 110, an address generator 120, a memory 130, a read mapper 140, a write mapper 150, and a controller 160.

The MAC unit 110 includes a plurality of MAC circuits 111 and an arithmetic unit 116. Each of the plurality of MAC circuits 111 includes a multiplier 112 and an accumulator 115. The accumulator 115 accumulates outputs of the multiplier 112. To this end, the accumulator 115 includes an adder 113 and a register 114. The accumulator 115 or the register 114 may be omitted from the MAC circuit 111. Strictly, the MAC circuit 111 from which the register 114 is omitted corresponds to an add-multiply circuit. However, the present invention assumes that such an add-multiply circuit is included in the scope of the MAC circuit 111. Strictly, the MAC circuit 111 from which the accumulator 115 is omitted corresponds to a multiply circuit. However, the present invention assumes that such a multiply circuit is included in the scope of the MAC circuit 111. That is, in a broad sense, the MAC circuit 111 of the present invention includes a multiply-add circuit and a multiply circuit as well as a multiply-accumulate circuit. The arithmetic unit 116 may perform at least one of addition, subtraction, accumulation, and shifting on a plurality of outputs of the plurality of MAC circuits 111. The arithmetic unit 116 outputs one or more MAC outputs Mout1 to MoutC (here, C is an integer) obtained through the at least one arithmetic operation. The arithmetic unit 116 may additionally output a flag FL indicating an arithmetic operation result. The arithmetic operation performed by the arithmetic unit 116 is changed according to a computation (e.g., fast Fourier transform (FFT), finite impulse response (FIR), or the like) to be performed by the multi-functional computing apparatus. Accordingly, the arithmetic operation performed by the arithmetic unit 116 is changed according to an arithmetic control signal ACS delivered from the controller 160.

The address generator 120 generates a read address group RAG and delivers the read address group RAG to the memory 130. The read address group RAG has a plurality of read addresses. The address generator 120 generates a write address group WAG and delivers the write address group WAG to the memory 130. The write address group WAG has a plurality of write addresses. The address generator 120 generates a read mapping value RMV and a write mapping value WMV and delivers the read mapping value RMV and the write mapping value WMV to the read mapper 140 and the write mapper 150, respectively.

The address generator 120 has, for example, a counter 122 and a lookup table 124. The counter 122 outputs a value changing based on a clock signal CK. As an example, the counter 122 outputs an integer value increasing according to a clock signal CK. The lookup table 124 outputs a read address group RAG that is selected according to a value output from the counter 122 from among a plurality of read address groups. To this end, the lookup table 124 stores the plurality of read address groups. Also, the lookup table 124 outputs a write address group WAG that is selected according to a value output from the counter 122 from among a plurality of write address groups. To this end, the lookup table 124 stores the plurality of write address groups. Instead of the write address group WAG being output from the lookup table 124, the write address group WAG may be obtained by delaying the read address group RAG The lookup table 124 outputs a read mapping value RMV that is selected according to a value output from the counter 122 from among a plurality of read mapping values. To this end, the lookup table 124 stores the plurality of read mapping values. The lookup table 124 outputs a write mapping value WMV that is selected according to a value output from the counter 122 from among a plurality of write mapping values. To this end, the lookup table 124 stores the plurality of write mapping values.

Unlike that shown, the address generator 120 may have a state machine (not shown). The state machine generates a read address group RAG a write address group WAG a read mapping value RMW, and a write mapping value WMV according to a clock signal. When the address generator 120 has a state machine, the lookup table 124 or the counter 122 may be omitted.

The memory 130 has a plurality of banks 132. Accordingly, the memory 130 may simultaneously read or write multiple data. As an example, when the memory 130 has four banks 132, the memory 130 may simultaneously read or write four pieces of data. In this case, it will be appreciated that four pieces of data should be positioned in different banks 132. As an example, the memory 130 may be a dual-port memory. In this case, the memory 130 may simultaneously perform a write operation and a read operation. As an example, when the memory 130 has four banks 132, the memory 130 may simultaneously read four pieces of data and write four pieces of data. In this case, it will be appreciated that four pieces of data that have been read should be positioned in the different banks 132 and four pieces of data that have been written should also be positioned in the different banks 132.

The plurality of banks 132 store a plurality of read data groups. The memory 130 delivers, to the MAC unit 110, a read data group RDG corresponding to the read address group RAG selected from among the plurality of read data groups. The read data group RDG has a plurality of pieces of read data. Each of the pieces of read data may be a complex number, a real number, or an integer. The plurality of pieces of read data are output from the different banks 132. When the memory 130 has first to fourth banks, first to fourth pieces of read data among the read data groups may be output from the first to fourth banks, respectively. The plurality of pieces of read data may be positioned in the same row. As an example, the first to fourth pieces of read data may be 1st pieces of data of the first to fourth banks, respectively. The plurality of pieces of read data may be positioned in different rows. As an example, the first and third pieces of read data may be 5th pieces of data of the first and third banks, respectively, and the second and fourth pieces of read data may be 6th pieces of data of the second and fourth banks, respectively.

The plurality of banks 132 store one or more write data groups. The memory 130 stores the write data group WDG at a position corresponding to the write address group WAG The write data group WDG has one or more pieces of write data. Each of the one or more pieces of write data may be a complex number, a real number, or an integer. The one or more pieces of write data are stored in the different banks 132. When the memory 130 has first to fourth banks, first to fourth pieces of write data among the one or more pieces of write data may be stored in the first to fourth banks, respectively. The one or more pieces of write data may be stored in the same row. As an example, the first to fourth pieces of write data may be stored at 1st positions of the first to fourth banks, respectively. The plurality of pieces of write data may be stored in different rows. As an example, the first and third pieces of write data may be stored at 5th positions of the first and third banks, respectively, and the second and fourth pieces of write data may be stored at 6th positions of the second and fourth banks, respectively.

The read mapper 140 maps a plurality of pieces of read data to a plurality of MAC inputs Min1 to MinB (here, B is an integer) according to the read mapping value RMV. The write mapper 150 maps one or more MAC outputs Mout1 to MoutC to one or more pieces of write data according to the write mapping value WMV.

The controller 160 stores initial read data groups in the memory 130, stores a plurality of read address groups in the lookup table 124, and then activates the address generator 120. The controller 160 stores the initial read data groups in the memory such that a plurality of pieces of read data are output from different banks among the plurality of banks 132 while the plurality of MAC circuits 111 operate simultaneously. Also, the controller 160 delivers, to the arithmetic unit 116, an arithmetic control signal ACS corresponding to a computation to be performed by the multi-functional computing apparatus. In this way, the controller 160 is mainly involved in an initial operation of the multi-functional computing apparatus and is hardly or not at all involved while the multi-functional computing apparatus performs computations (e.g., FFT, FIR, etc.). That is, while a computation is performed, the computation is mainly controlled by the address generator 120. Accordingly, the burden on the controller 160 is reduced. As an example, the controller 160 may be a central processing unit (CPU).

Figure 2:
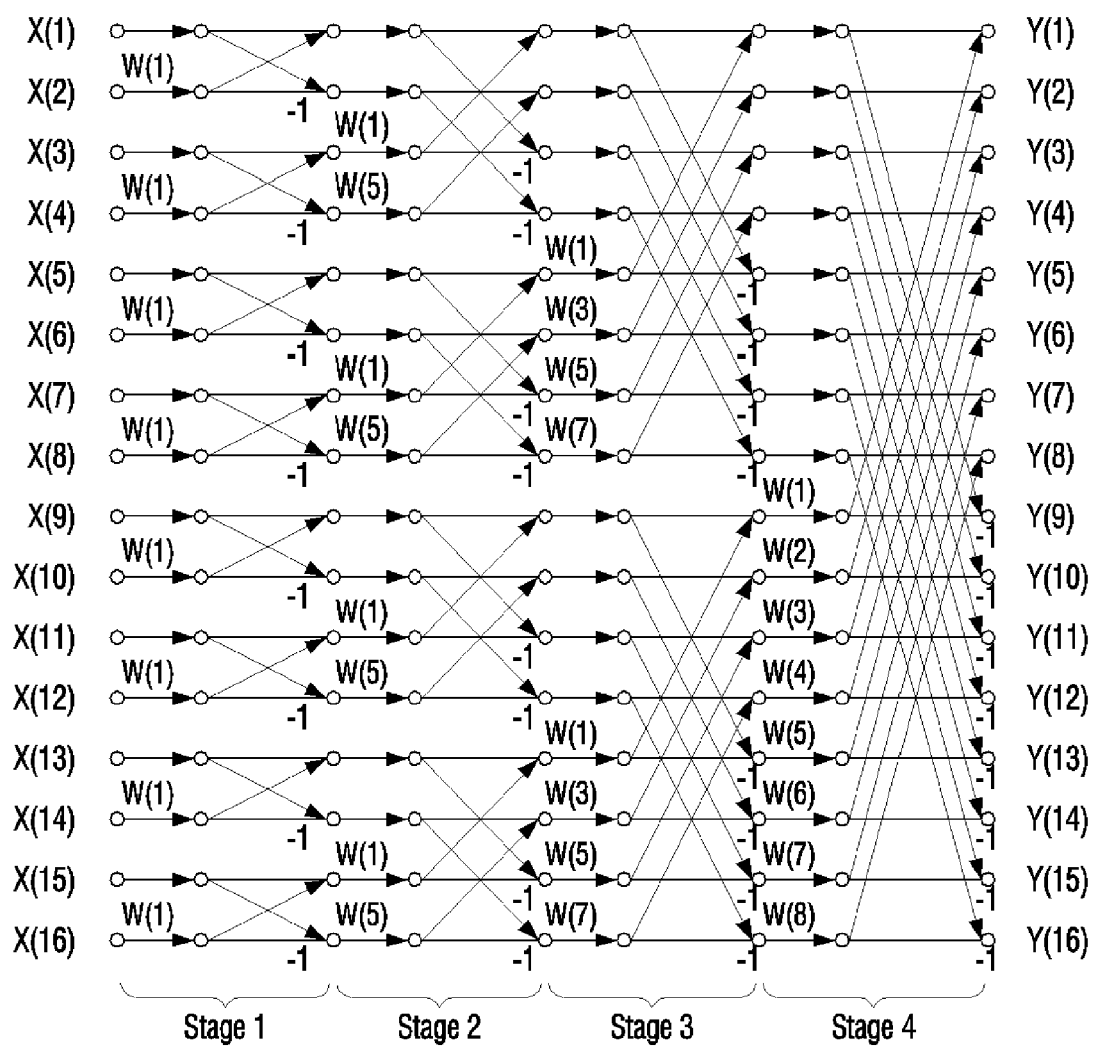
Figures 3, 4:
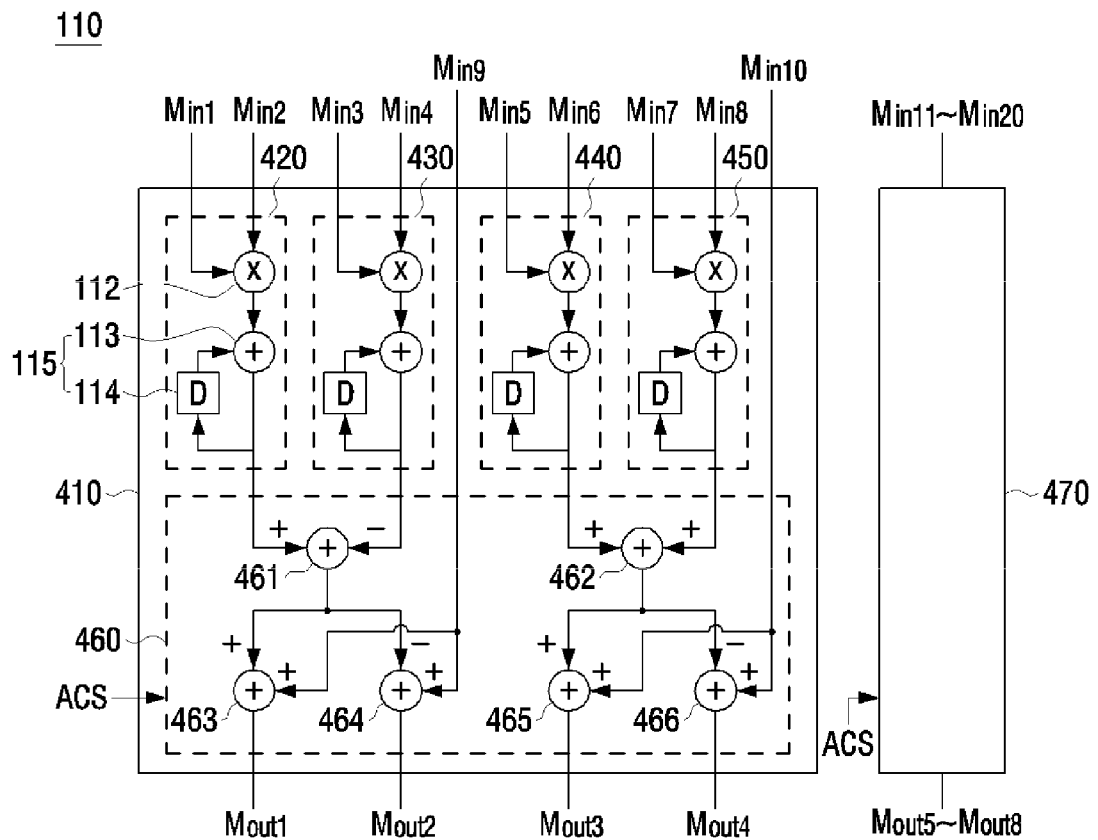

The multi-functional computing apparatus shown in FIG. 1 may perform a FFT computation. FIGS. 2 to 10 are diagrams for describing operation when the multi-functional computing apparatus shown in FIG. 1 has eight MACs and performs a 16-point FFT computation. FIG. 2 is a diagram showing a computation "radix2, decimation in time" as an example of the 16-point FFT computation. The 16-point FFT computation has four stages, and eight butterfly computations are performed for each stage. The 16-point FFT has 16 inputs X(1) to X(16) and 16 outputs Y(1) to Y(16). FIG. 3 is a diagram for simply describing a butterfly computation. In FIG. 3, a butterfly receives first and second butterfly inputs x1 and x2 and a twiddle factor w and outputs first and second butterfly outputs y1 and y2.

FIG. 4 is a diagram for describing operation of a MAC unit. Referring to FIG. 4, the MAC unit 110 has a first butterfly circuit 410 and a second butterfly circuit 470. The first butterfly circuit 410 has first to fourth MAC circuits 420, 430, 440, and 450 and a first arithmetic unit 460. Each of the first to fourth MAC circuits 420, 430, 440, and 450 includes a multiplier 112 and an accumulator 115. For an FFT mode, the accumulator 115 does not operate because each MAC circuit only has to perform multiplication. Accordingly, the register 114 included in the accumulator 115 operates in a reset status and outputs "0." The first MAC circuit 420 outputs a value obtained by multiplying the first MAC input Min1 and the second MAC input Min2. The second MAC circuit 430 outputs a value obtained by multiplying the third MAC input Min3 and the fourth MAC input Min4. The third MAC circuit 440 outputs a value obtained by multiplying the fifth MAC input Min5 and the sixth MAC input Min6. The fourth MAC circuit 450 outputs a value obtained by multiplying the seventh MAC input Min7 and the eighth MAC input Min8.

The first arithmetic unit 460 outputs first to fourth outputs Mout1 to Mout4. The first output Mout1 corresponds to a value obtained by adding an output of the first MAC circuit 420 to a ninth input Min9 and subtracting an output of the second MAC circuit 430 from the sum. The second output Mout2 corresponds to a value obtained by subtracting the output of the first MAC circuit 420 from the ninth input Min9 and adding the output of the second MAC circuit 430 to the difference. The third output Mout3 corresponds to a value obtained by adding an output of the third MAC circuit 440 to a tenth input Min10 and adding an output of the fourth MAC circuit 450 to the sum. The fourth output Mout4 corresponds to a value obtained by subtracting the output of the third MAC circuit 440 from the tenth input Min10 and subtracting the output of the fourth MAC circuit 450 from the difference. In order to perform such a computation, the first arithmetic unit 460 includes first to sixth addition units 461 to 466. The first addition unit 461 subtracts the output of the second MAC circuit 430 from the output of the first MAC circuit 420. The second addition unit 462 adds the output of the fourth MAC circuit 450 to the output of the third MAC circuit 440. The third addition unit 463 adds the output of the first addition unit 461 to the ninth MAC input Min9. The fourth addition unit 464 subtracts an output of the first addition unit 461 from the ninth MAC input Min9. The fifth addition unit 465 adds an output of the second addition unit 462 to the tenth MAC input Min10. The sixth addition unit 466 subtracts the output of the second addition unit 462 from the tenth MAC input Min10.

The second butterfly circuit 470 receives eleventh to twentieth MAC inputs Min11 to Min20 and outputs fifth to eighth MAC outputs Mout5 to Mout8. The second butterfly circuit 470 has the same configuration as the first butterfly circuit 410, and thus a detailed description thereof will be omitted.

In order for the butterfly circuit 410 of FIG. 4 to perform a butterfly computation, a real number x1[R] and an imaginary number x1[I] of the first butterfly input x1 are input as the ninth MAC input Min9 and the tenth MAC input Min10, respectively. A real number x2[R] of the second butterfly input x2 is input as the first and fifth MAC inputs Min1 and Min5. An imaginary number x2[I] of the second butterfly input x2 is input as the third and seventh MAC inputs Min3 and Min7. A real number w[R] of the twiddle factor w is input as the second and eighth MAC inputs Min2 and Min8. An imaginary number w[I] of the twiddle factor w is input as the fourth and sixth MAC inputs Min4 and Min6. When the inputs are applied in this way, the first MAC output Mout1 corresponds to a real number of the first butterfly output y1. The second MAC output Mout2 corresponds to a real number of the second butterfly output y2. The third MAC output Mout3 corresponds to an imaginary number of the first butterfly output y1. The fourth MAC output Mout4 corresponds to an imaginary number of the second butterfly output y2.

Figure 5:
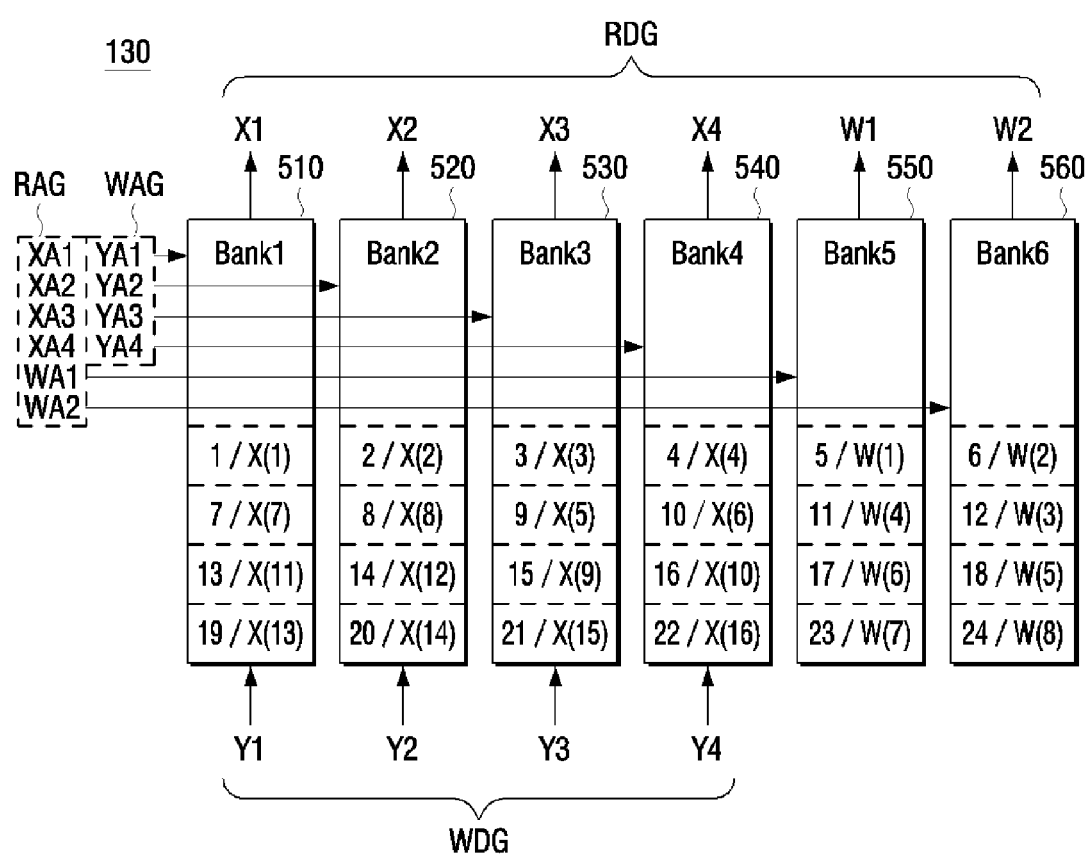

Referring to FIG. 5, the memory 130 has first to sixth banks 510 to 560. For example, the first to fourth banks 510 to 540 are dual-port memories and may simultaneously perform four outputs and four inputs. For example, the fifth and sixth banks 550 and 560 are single-port memories and may simultaneously perform two outputs.

The first to fourth banks 510 to 540 output first to fourth butterfly inputs X1 to X4 corresponding to first to fourth butterfly input addresses XA1 to XA4. The first to fourth banks 510 to 540 receive first to fourth butterfly outputs Y1 to Y4 corresponding to first to fourth butterfly output addresses YA1 to YA4. The fifth and sixth banks 550 and 560 output first and second twiddle factors W1 and W2 corresponding to first and second twiddle factor addresses WA1 and WA2.

The first to fourth butterfly input addresses XA1 to XA4 and the first and second twiddle factor addresses WA1 and WA2 correspond to the read address group RAG of FIG. 1. That is, the read address group RAG includes, as a plurality of read addresses, the first to fourth butterfly input addresses XA1 to XA4 and the first and second twiddle factor addresses WA1 and WA2. The first to fourth butterfly output addresses YA1 to YA4 correspond to the write address group WAG of FIG. 1. That is, the write address group WAG includes, as a plurality of write addresses, the first to fourth butterfly output addresses YA1 to YA4. The first to fourth butterfly inputs X1 to X4 and the first and second twiddle factors W1 and W2 correspond to the read data group RDG of FIG. 1. That is, the read data group RDG includes, as a plurality of pieces of read data, the first to fourth butterfly inputs X1 to X4 and the first and second twiddle factors W1 and W2. The first to fourth butterfly outputs Y1 to Y4 correspond to the write data group WDG of FIG. 1. That is, the write data group WDG includes, as a plurality of pieces of write data, the first to fourth butterfly outputs Y1 to Y4.

The memory 130 stores initial read data groups X(1) to X(16) and W(1) to W(8) in a predetermined order such that a collision between the plurality of banks 510 to 560 is avoided during the FFT computation. As an example, the initial read data groups X(1) to X(16) and W(1) to W(8), which are values stored in the memory 130 before the FFT computation, are stored by the controller 160. In the drawing, 1/X(1) indicates that X(1) is stored at address #1, and 5/W(1) indicates that W(1) is stored at address #5.

Generally, the 16-point FFT inputs X(1) to X(16) are stored in the sequential order of X(1), X(2), X(3), X(4), X(5), X(6), X(7), X(8), X(9), X(10), X(11), X(12), X(13), X(14), X(15), and X(16). However, according to this embodiment, the 16-point FFT inputs X(1) to X(16) are stored in a predetermined order of X(1), X(2), X(3), X(4), X(7), X(8), X(5), X(6), X(11), X(12), X(9), X(10), X(13), X(14), X(15), and X(16). As an example, the predetermined order is not sequential, but sequential in units of rows. That is, X(1) to X(4) are positioned in the 1st row, X(5) to X(8) are positioned in the 2nd row, X(9) to X(12) are positioned in the 3rd row, and X(13) to X(16) are positioned in the 4th row. The predetermined order is previously obtained through simulation so that a collision may be avoided between the banks 510 to 540 during the FFT calculation. Here, the collision between the banks 510 to 540 indicates that two or more of the first to fourth butterfly inputs X1 to X4 are simultaneously read by one bank. One bank may output only one butterfly input at a time. Accordingly, when two or more butterfly inputs must be read by one bank, normal operation becomes impossible. The simulation may be performed during a program compiling process. As an example, a compiler checks whether a collision occurs between banks. When a collision has occurred, the predetermined order may be determined by repeating a process of exchanging positions of some of the initial FFT inputs X(1) to X(16).

Generally, the 8 twiddle factors W(1) to W(8) are stored in the sequential order of W(1), W(2), W(3), W(4), W(5), W(6), W(7), and W(8). However, according to this embodiment, the 8 twiddle factors W(1) to W(8) are stored in a predetermined order of W(1), W(2), W(4), W(3), W(6), W(5), W(7), and W(8). As an example, the predetermined order is not sequential, but sequential in units of rows. That is, W(1) and W(2) are positioned in the 1st row, W(3) and W(4) are positioned in the 2nd row, W(5) and W(6) are positioned in the 3rd row, and W(7) and W(8) are positioned in the 4th row. The predetermined order is previously obtained through simulation so that a collision may be avoided between the banks 550 to 560 during the FFT calculation.

Figure 6:
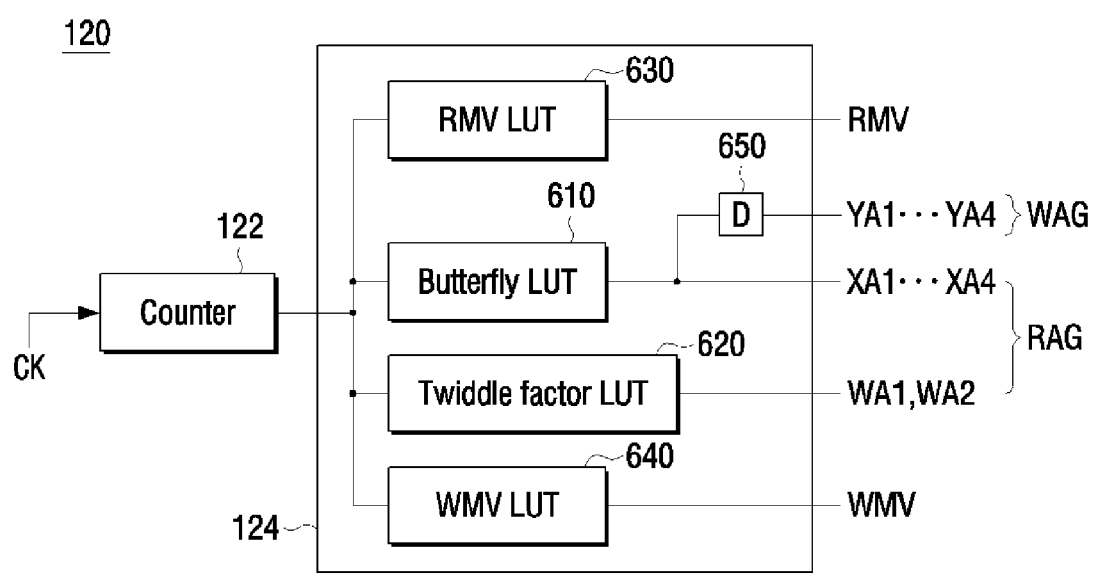

Referring to FIG. 6, the lookup table 124 of the address generator 120 includes a butterfly lookup table 610, a twiddle factor lookup table 620, a read mapping value lookup table 630, a write mapping value lookup table 640, and a register 650. As an example, the controller 160 inputs values required by the butterfly lookup table 610, the twiddle factor lookup table 620, the read mapping value lookup table 630, and the write mapping value lookup table 640 and then activates the counter 122.

The butterfly lookup table 610 outputs a plurality of butterfly input addresses XA1 to XA4 corresponding to an output value of the counter 122. The register 650 outputs a plurality of butterfly output addresses YA1 to YA4 obtained by delaying the plurality of butterfly input addresses XA1 to XA4 by one or more clock cycles. The delay performed by the register 650 corresponds to a delay time it takes from when a plurality of butterfly inputs X1 to X4 are output from the memory 130 until a plurality of butterfly outputs Y1 to Y4 are input to the memory 130. Although not explicitly shown in FIG. 1, it may take one or more clock cycles from when the plurality of butterfly inputs X1 to X4 are output from the memory 130 until the plurality of butterfly outputs Y1 to Y4 are input to the memory 130. By using values obtained by delaying the plurality of butterfly input addresses XA1 to XA4 as the plurality of butterfly output addresses YA1 to YA4, the plurality of butterfly outputs Y1 to Y4 are stored at positions where the plurality of butterfly inputs X1 to X4 were present in the memory 130.

The twiddle factor lookup table 620 outputs one or more twiddle factor addresses WA1 and WA2 corresponding to an output value of the counter 122. The read mapping value lookup table 630 outputs a read mapping value RMV corresponding to the output value of the counter 122. The write mapping value lookup table 640 outputs a write mapping value WMV corresponding to the output value of the counter 122.

FIG. 7 is a diagram showing values stored in the butterfly lookup table 610. Referring to FIG. 7, in the first cycle, the butterfly lookup table 610 outputs #1, #2, #3, and #4 as the plurality of butterfly input addresses XA1 to XA4. Accordingly, the memory 130 outputs X(1), X(2), X(3), and X(4) positioned at addresses #1, #2, #3, and #4 as the plurality of butterfly inputs X1 to X4. Since the plurality of butterfly input addresses XA1 to XA4 are also used as the plurality of butterfly output addresses YA1 to YA4, the plurality of butterfly outputs Y1 to Y4 are stored at the same addresses in the memory, that is, at addresses #1, #2, #3, and #4. In the second cycle, the butterfly lookup table 610 outputs #7, #8, #9, and #10 as the plurality of butterfly input addresses XA1 to XA4. Accordingly, the memory 130 outputs X(7), X(8), X(5), and X(6) positioned at addresses #7, #8, #9, and #10 as the plurality of butterfly inputs X1 to X4. Since the plurality of butterfly input addresses XA1 to XA4 are also used as the plurality of butterfly output addresses YA1 to YA4, the plurality of butterfly outputs Y1 to Y4 are stored at the same addresses in the memory, that is, at addresses #7, #8, #9, and #10. In this way, in the third cycle, the butterfly lookup table 610 outputs #13, #14, #15, and #16, and the memory 130 outputs X(11), X(12), X(9), and X(10). In the fourth cycle, the butterfly lookup table 610 outputs #19, #20, #21, and #22, and the memory 130 outputs X(13), X(14), X(15), and X(16). The subsequent operation is performed in the same manner as described above, and thus a description thereof will be omitted for convenience of description.

FIG. 8 is a diagram showing values stored in the twiddle factor lookup table 620. Referring to FIG. 8, in the first to fourth cycles, the twiddle factor lookup table 620 outputs #5 and N/A as one or more butterfly input addresses WA1 and WA2. Here, N/A indicates that there is no output value. The memory 130 outputs W(1) positioned at address #5 as one or more twiddle factors W1. In the fifth cycle, the twiddle factor lookup table 620 outputs #5 and #18 as the one or more butterfly input addresses WA1 and WA2. The memory 130 outputs W(1) and W(5) positioned at addresses #5 and #18 as the one or more twiddle factors W1 and W2. The subsequent operation is performed in the same manner as described above, and thus a description thereof will be omitted for convenience.

FIG. 9 is a diagram for describing operation of the read mapper 140. Referring to FIG. 9, in the first cycle, the read mapper 140 maps a real number X2[R] of a second butterfly input X2 to a first MAC input Min1, maps a real number W1[R] of a first twiddle factor W1 to a second MAC input Min2, maps an imaginary number X2[I] of the second butterfly input X2 to a third MAC input Min3, and maps an imaginary number W1[I] of the first twiddle factor W1 to a fourth MAC input Min4. In this way, X2[R], W1[I], X2[I], W1[R], X1[R], X1[I], X4[R], W1[R], X4[I], W1[I], X4[R], W1[I], X4[I], W1[R], X3[R], and X3[I] are mapped to fifth to twentieth MAC inputs Min5 to Min20, respectively. In the second cycle, the read mapper 140 maps X4[R], W1[R], X4[I], W1[I], X4[R], W1[I], X4[I], W1[R], X3[R], X3[I], X2[R], W1[R], X2[I], W1[I], X2[R], W1[I], X2[I], W1[R], X1[R], and X1[I] to the first to twentieth MAC inputs Min1 to Min20, respectively. The subsequent operation is performed in the same manner as described above, and thus a description thereof will be omitted for convenience.

Also, it is possible to reduce the complexity of the mapper by exchanging storage positions between data in the same row and making a change rule constant in the changed rows. Also, details about the changes of addresses corresponding to the changes of pieces of data in the same row among the mapping information may be incorporated into a read or write address memory (i.e., the butterfly lookup table 610 and the twiddle factor lookup table 620). The procedures and details of this process are determined and acquired through simulation.

FIG. 10 is a diagram for describing operation of the write mapper 150. Referring to FIG. 10, in the first cycle, the write mapper 150 maps a first MAC output Mout1 to a real value Y1[R] of a first butterfly output Y1, maps a second MAC output Mout2 to a real value Y2[R] of a second butterfly output Y2, maps a third MAC output Mout3 to an imaginary value Y1[I] of the first butterfly output Y1, and maps a fourth MAC output Mout4 to an imaginary value Y2[I] of the second butterfly output Y2. Also, the write mapper 150 maps fifth to eighth MAC outputs Mout5 to Mout8 to Y3 [R], Y4[R], Y3 [I], and Y4[I], respectively. In the second cycle, the write mapper 150 maps first to eighth MAC outputs Mout1 to Mout8 to Y3 [R], Y4[R], Y3 [I], Y4[I], Y1[R], Y2[R], Y1[I], and Y2[I], respectively. The subsequent operation is performed in the same manner as described above, and thus a description thereof will be omitted for convenience of description.

Figure 11:
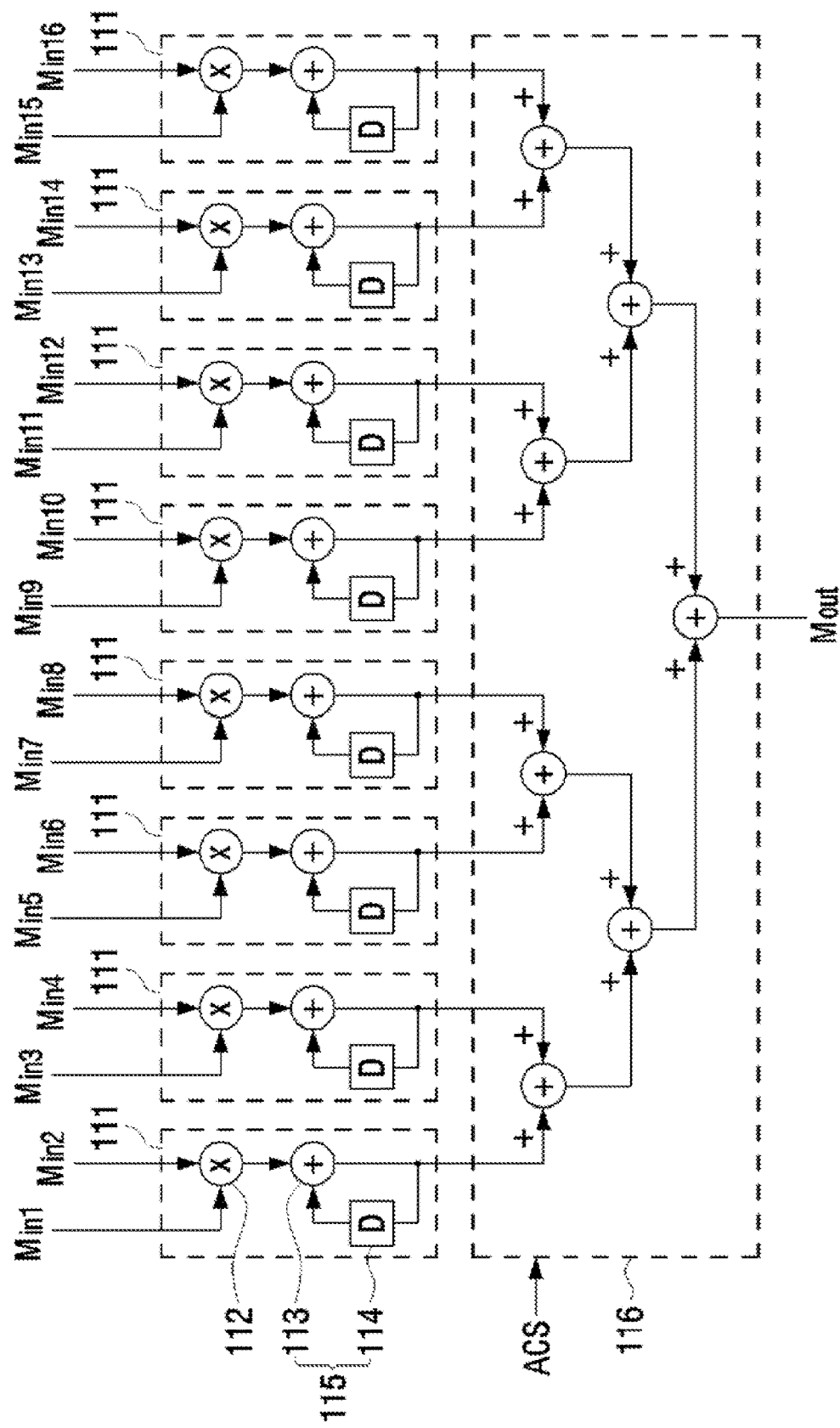
FIGS. 11 to 14 are diagrams for describing operation when the multi-functional computing apparatus has eight MAC circuits and performs a finite impulse response (FIR) computation.
Figure 12:
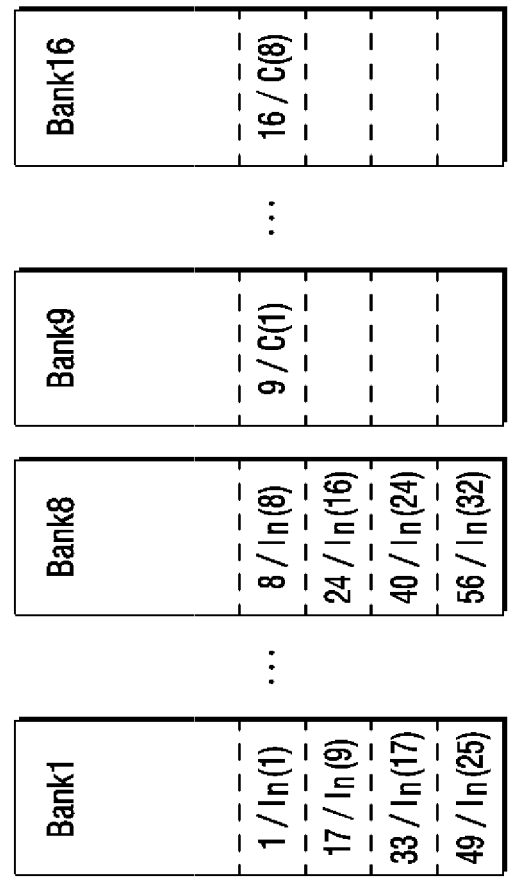
Figure 13:
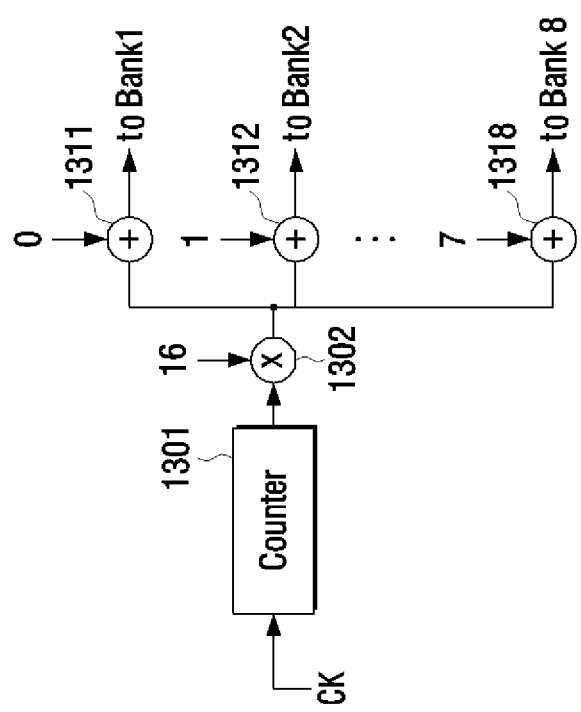

The multi-functional computing apparatus shown in FIG. 1 may perform a FIR computation. FIGS. 11 to 13 are diagrams for describing operation when the multi-functional computing apparatus has eight MAC circuits and performs an FIR computation.

Referring to FIG. 11, the MAC unit 110 has eight MAC circuits 111 and an arithmetic unit 116. Each of the eight MAC circuits 111 has a multiplier 112 and an accumulator 115 to multiply two MAC inputs and accumulate the product. The arithmetic unit 116 has a plurality of addition units and adds all values output from the eight MAC circuits 111. When odd-numbered MAC inputs Min1, Min3, . . . , Min15 are inputs of the FIR filter and even-numbered MAC inputs Min2, Min4, . . . , Min16 are coefficients for the FIR filter, the MAC unit 110 may process eight inputs at the same time. Accordingly, for a 32-tap FIR filter, the result may be obtained when the MAC unit 110 operates for four cycles. As described above, the computation performed by the arithmetic unit 116 is changed according to an arithmetic control signal ACS delivered from the controller 160 as shown in the drawing. The change of the configuration of the arithmetic unit 116 to be appropriate for the FFT computation or the FIR computation according to the arithmetic control signal ACS may be simply implemented through a combination of adders, switches, and the like, and thus a detailed configuration will be omitted for convenience.

Referring to FIG. 12, the memory 130 has first to sixteenth banks. The first to eighth banks store FIR inputs In(1) to In(32), and the ninth to sixteenth banks store FIR coefficients C(1) to C(8). In the first cycle, the memory 130 outputs In(1) to In(8) and C(1) to C(8). In(1) to In(8) are mapped to Min1, Min3, Min15, and C(1) to C(8) are mapped to Min2, Min4, . . . , Min16 by the read mapper 140. In the second cycle, the memory 130 outputs In(9) to In(16) and C(1) to C(8). In(9) to In(16) are mapped to Min1, Min3, . . . , Min15 and C(1) to C(8) are mapped to Min2, Min4, . . . , Min16 by the read mapper 140. The subsequent operation is performed in the same manner as described above, and thus a description thereof will be omitted for convenience. Since the coefficients C(1) to C(8) are consecutively output, the coefficients may be processed using a register instead of the banks. In this case, the number of banks used in the memory 130 may be reduced.

FIG. 13 shows an example in which the address generator 120 is implemented as a state machine. For convenience of description, a read mapping value RMV and addresses delivered to the ninth to sixteenth banks are not shown in the drawing because they are constants. Only the generation of addresses delivered to the first to eighth banks is shown in the drawing. The address generator 120 has a counter 1301, a multiplier 1302, and first to eighth adders 1311, 1312, . . . , 1318. The counter 1301 outputs an integer increasing from 0 by 1. The multiplier 1302 multiplies the output of the counter by 16. The adders 1311 to 1318 add 0 to 7 to the output of the multiplier 1302. The outputs of the adders 1311 to 1318 are delivered to the first to eighth banks.

Figure 14:
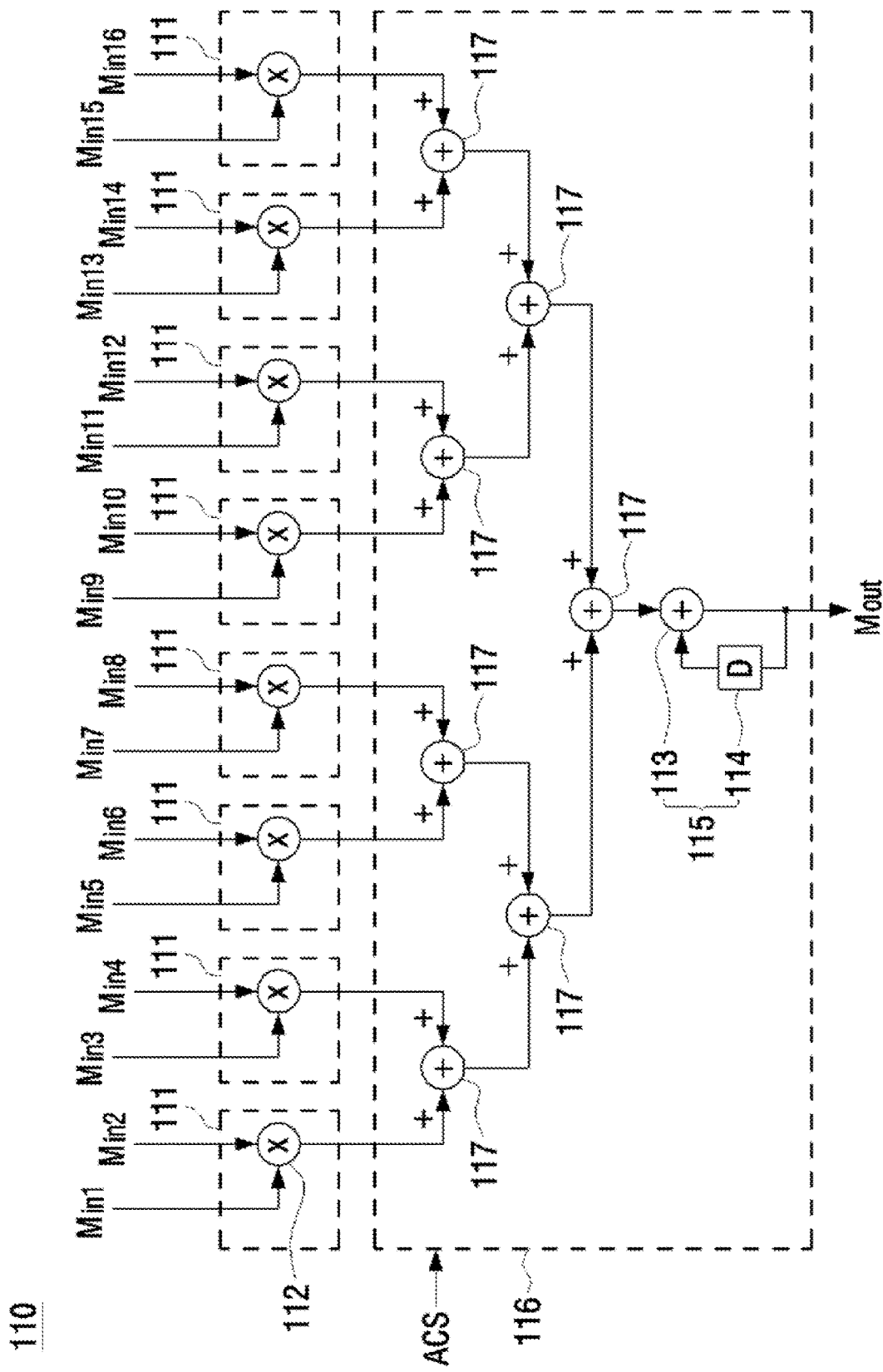

FIG. 14 is a diagram showing a modification of the MAC unit 110 shown in FIG. 11. Referring to FIG. 14, the MAC unit 110 has eight MAC circuits 111 and an arithmetic unit 116. Unlike that shown in FIG. 11, each of the eight MAC circuits 111 has only a multiplier 112. Also, the arithmetic unit 116 has an accumulator 115 as well as a plurality of adders 117. The accumulator 115 has an adder 113 and a register 114. By moving accumulators 115 which were positioned in the MAC circuits 111 to the arithmetic unit 116, it is advantageously possible to reduce the number of accumulators 115.

The above embodiments and drawings attached to the present specification are merely intended to clearly describe part of the technical spirit included in the present invention, and it is apparent that all modifications and detailed embodiments that can be easily derived by those skilled in the art within the scope of the technical spirit included in the specification and the drawings of the present invention are included in the scope of the invention. As an example, according to this embodiment, an FFT computation using eight MACs is illustrated by way of example. However, those skilled in the art will be able to apply the description to sixteen or more MACs as well.

Figure 15:
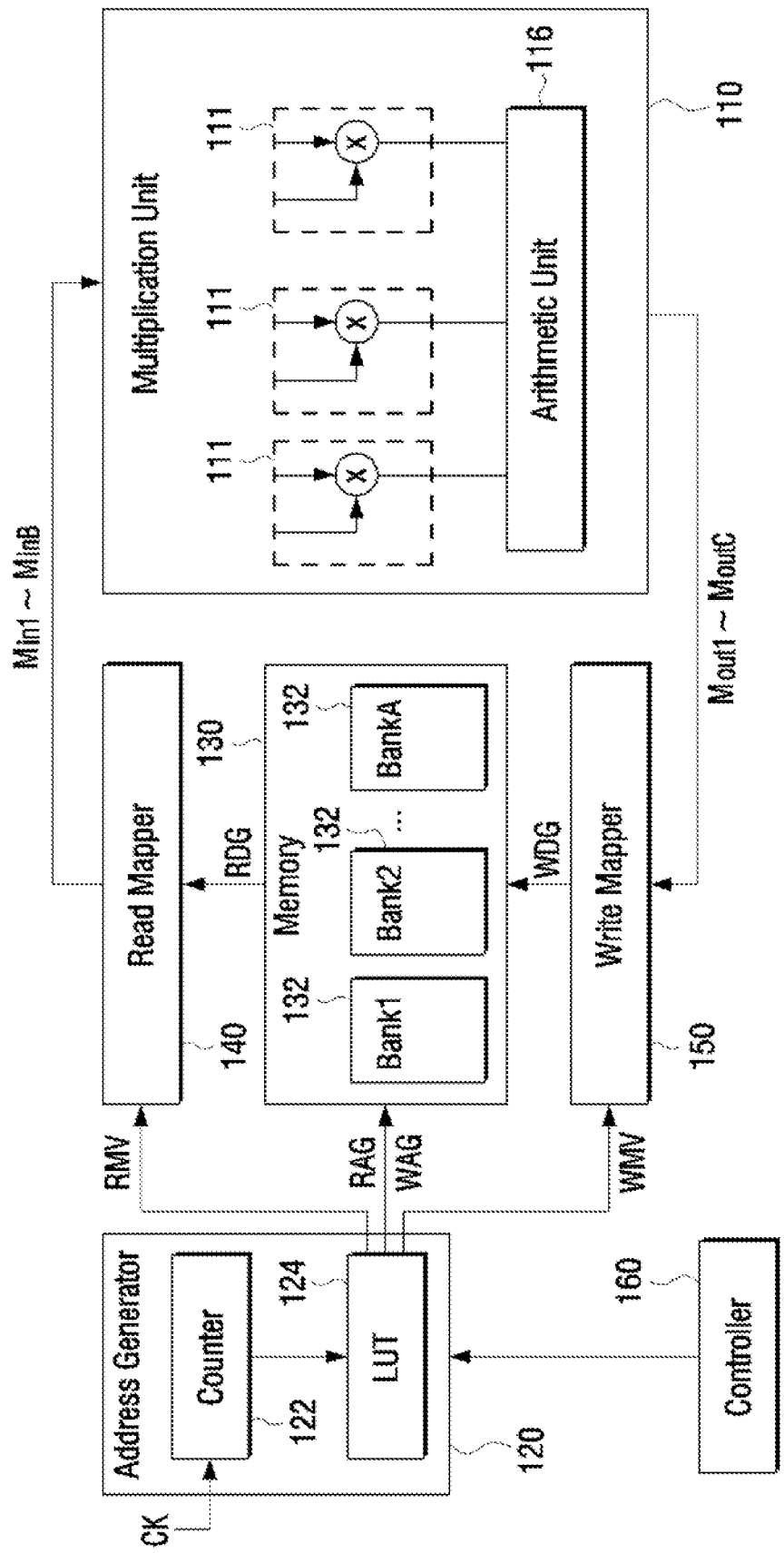
FIG. 15 is a diagram showing an FFT computing apparatus according to an embodiment.
Figure 16:
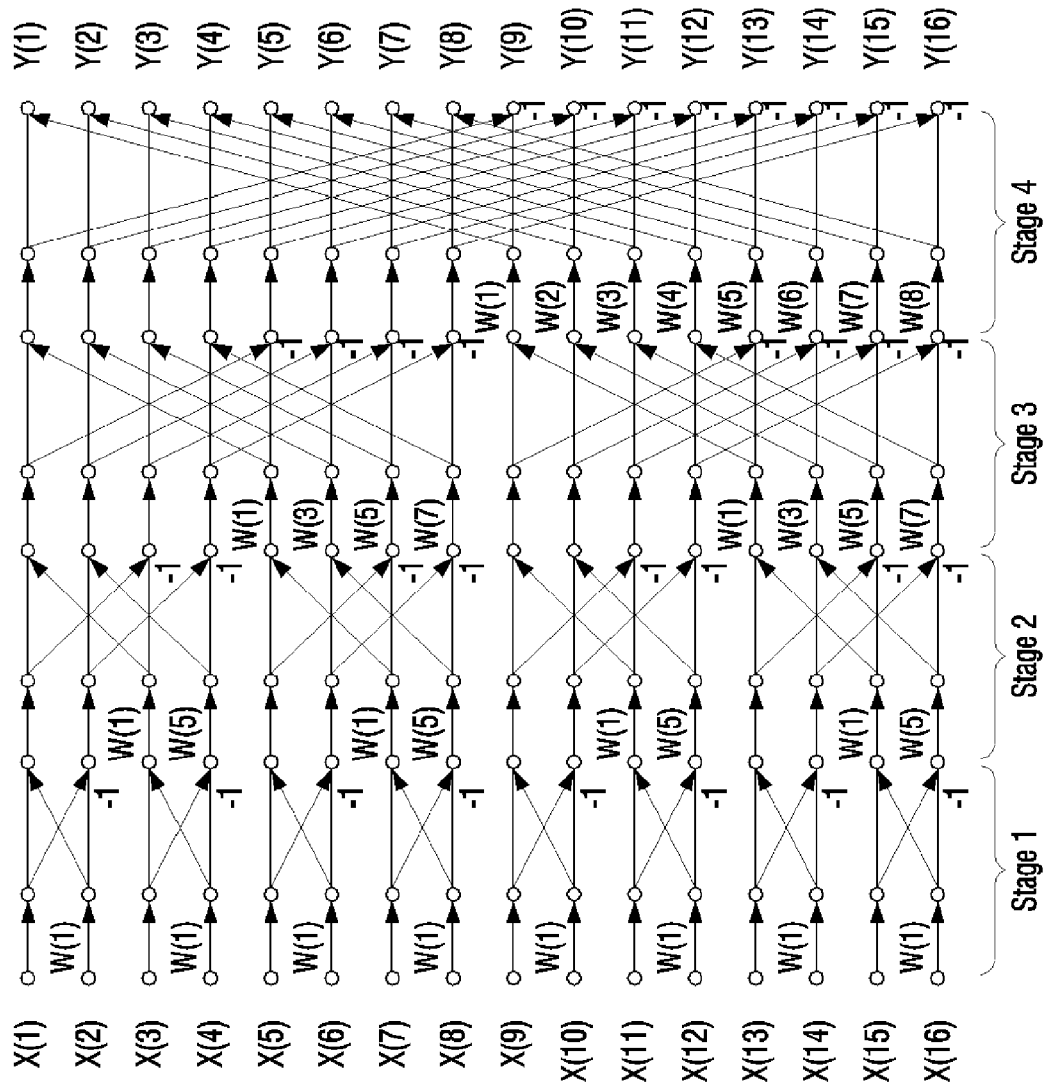

FIG. 15 is a diagram showing an FFT computing apparatus according to an embodiment. Referring to FIG. 15, the FFT computing apparatus has a multiplication unit 110, an address generator 120, a memory 130, a read mapper 140, a write mapper 150, and a controller 160.

The multiplication unit 110 has a plurality of multiply circuits 111 and an arithmetic unit 116. The arithmetic unit 116 may perform at least one computation of addition and subtraction on a plurality of outputs of the plurality of multiply circuits 111. The arithmetic unit 116 outputs a plurality of multiplication unit outputs Mout1 to MoutC (here, C is an integer) obtained through the at least one computation.

The address generator 120 generates a read address group RAG and delivers the read address group RAG to the memory 130. The read address group RAG has a plurality of read addresses. The address generator 120 generates a write address group WAG and delivers the write address group WAG to the memory 130. The write address group WAG has a plurality of write addresses. The address generator 120 generates a read mapping value RMV and a write mapping value WMV and delivers the read mapping value RMV and the write mapping value WMV to the read mapper 140 and the write mapper 150, respectively.

The address generator 120 has, for example, a counter 122 and a lookup table 124. The counter 122 outputs a value changing based on a clock signal CK. As an example, the counter 122 outputs an integer value increasing according to a clock signal CK. The lookup table 124 outputs a read address group RAG that is selected according to a value output from the counter 122 from among a plurality of read address groups. To this end, the lookup table 124 stores the plurality of read address groups. Also, the lookup table 124 outputs a write address group WAG that is selected according to a value output from the counter 122 from among a plurality of write address groups. To this end, the lookup table 124 stores the plurality of write address groups. Instead of the write address group WAG being output from the lookup table 124, the write address group WAG may be obtained by delaying the read address group RAG The lookup table 124 outputs a read mapping value RMV that is selected according to a value output from the counter 122 from among a plurality of read mapping values. To this end, the lookup table 124 stores the plurality of read mapping values. The lookup table 124 outputs a write mapping value WMV that is selected according to a value output from the counter 122 from among a plurality of write mapping values. To this end, the lookup table 124 stores the plurality of write mapping values.

Unlike that shown, the address generator 120 may have a state machine (not shown). The state machine generates a read address group RAG a write address group WAG a read mapping value RMW, and a write mapping value WMV according to a clock signal. When the address generator 120 has a state machine, the lookup table 124 or the counter 122 may be omitted.

The memory 130 has a plurality of banks 132. Accordingly, the memory 130 may simultaneously read or write multiple data. As an example, when the memory 130 has four banks 132, the memory 130 may simultaneously read or write four pieces of data. In this case, it will be appreciated that four pieces of data should be positioned in the different banks 132. As an example, the memory 130 may be a dual-port memory. In this case, the memory 130 may simultaneously perform a write operation and a read operation. As an example, when the memory 130 has four banks 132, the memory 130 may simultaneously read four pieces of data and write four pieces of data. In this case, it will be appreciated that four pieces of data that have been read should be positioned in the different banks 132 and four pieces of data that have been written should also be positioned in the different banks 132.

The plurality of banks 132 store a plurality of read data groups. The memory 130 delivers, to the multiplication unit 110, a read data group RDG corresponding to the read address group RAG selected from among the plurality of read data groups. The read data group RDG has a plurality of pieces of read data. Each of the pieces of read data may be a complex number, a real number, or an integer. The plurality of pieces of read data are output from the different banks 132. When the memory 130 has first to fourth banks, first to fourth pieces of read data among the read data groups may be output from the first to fourth banks, respectively. The plurality of pieces of read data may be positioned in the same row. As an example, the first to fourth pieces of read data may be 1st pieces of data of the first to fourth banks, respectively. The plurality of pieces of read data may be positioned in different rows. As an example, the first and third pieces of read data may be 5th pieces of data of the first and third banks, and the second and fourth pieces of read data may be 6th pieces of data of the second and fourth banks.

The plurality of banks 132 store a plurality of write data groups. The memory 130 stores the write data group WDG at a position corresponding to the write address group WAG The write data group WDG has a plurality of pieces of write data. Each of the plurality of pieces of write data may be a complex number, a real number, or an integer. The plurality of pieces of write data are stored in the different banks 132. When the memory 130 has first to fourth banks, first to fourth pieces of write data among the plurality of pieces of write data may be stored in the first to fourth banks, respectively. The plurality of pieces of write data may be stored in the same row. As an example, the first to fourth pieces of write data may be stored at 1st positions of the first to fourth banks, respectively. The plurality of pieces of write data may be stored in different rows. As an example, the first and third pieces of write data may be stored at 5th positions of the first and third banks, respectively, and the second and fourth pieces of write data may be stored at 6th positions of the second and fourth banks, respectively.

The read mapper 140 maps a plurality of pieces of read data to a plurality of multiplication unit inputs Min1 to MinB (here, B is an integer) according to the read mapping value RMV. The write mapper 150 maps a plurality of multiplication unit outputs Mout1 to MoutC to a plurality of pieces of write data according to the write mapping value WMV.

The controller 160 stores initial read data groups in the memory 130, stores a plurality of read address groups in the lookup table 124, and then activates the address generator 120. The controller 160 stores the initial read data groups in the memory such that a plurality of pieces of read data are output from different banks among the plurality of banks 132 while the plurality of multiply circuits 111 operate simultaneously. In this way, the controller 160 is mainly involved in an initial operation of the FFT computing apparatus and is hardly or not at all involved while the FFT computing apparatus performs computations. That is, while a computation is performed, the computation is mainly controlled by the address generator 120. Accordingly, the burden on the controller 160 is reduced. As an example, the controller 160 may be a CPU.

Figure 17:
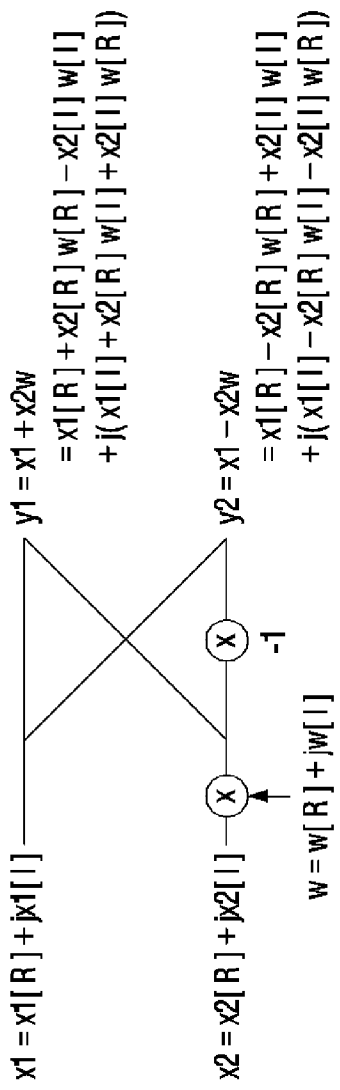

FIGS. 16 to 24 are diagrams for describing operation when the FFT computing apparatus shown in FIG. 15 has eight multiply circuits and performs a 16-point FFT computation, for example, a computation "radix2, decimation in time." The 16-point FFT computation has four stages, and eight butterfly computations are performed for each stage. The 16-point FFT has 16 inputs X(1) to X(16) and 16 outputs Y(1) to Y(16). FIG. 17 is a diagram for simply describing a butterfly computation. In FIG. 17, a butterfly receives first and second butterfly inputs x1 and x2 and a twiddle factor w and outputs first and second butterfly outputs y1 and y2.

Figure 18:
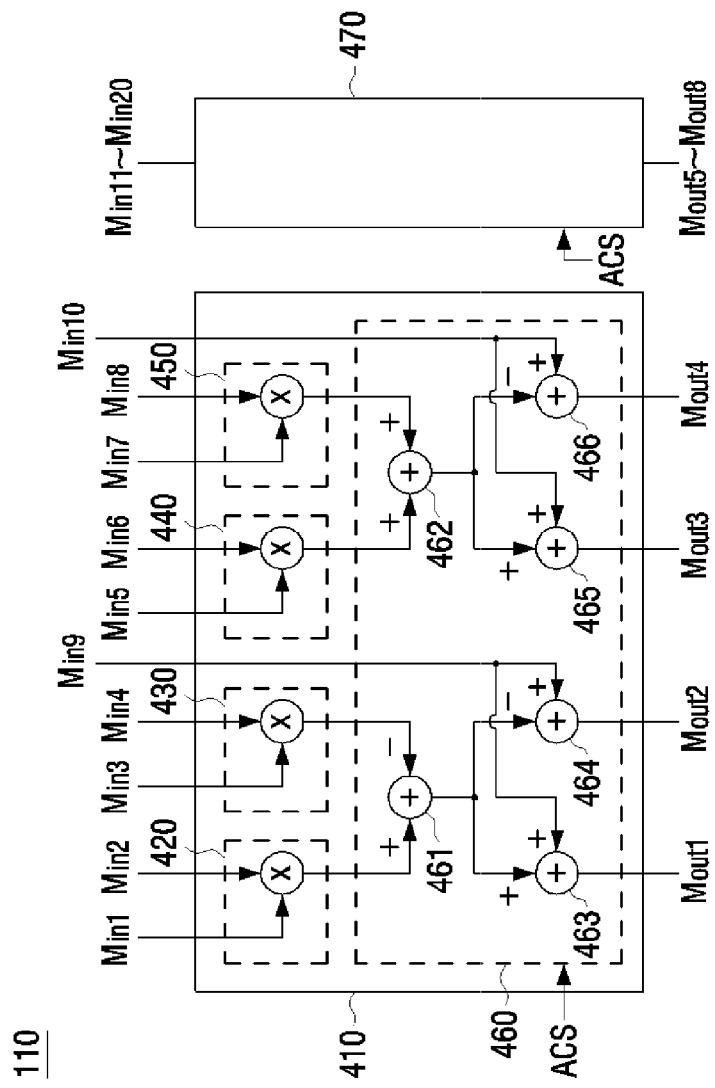

FIG. 18 is a diagram for describing operation of the multiplication unit. Referring to FIG. 18, the multiplication unit 110 has a first butterfly circuit 410 and a second butterfly circuit 470. The first butterfly circuit 410 has first to fourth multiply circuits 420, 430, 440, and 450 and a first arithmetic unit 460. The first multiply circuit 420 outputs a value obtained by multiplying the first and second multiplication unit inputs Min1 and Min2. The second multiply circuit 430 outputs a value obtained by multiplying the third and fourth multiplication unit inputs Min3 and Min4. The third multiply circuit 440 outputs a value obtained by multiplying the fifth and sixth multiplication unit inputs Min5 and Min6. The fourth multiply circuit 450 outputs a value obtained by multiplying the seventh and eighth multiplication unit inputs Min7 and Min8.

The first arithmetic unit 460 outputs first to fourth multiplication unit outputs Mout1 to Mout4. The first multiplication unit output Mout1 corresponds to a value obtained by adding an output of the first multiply circuit 420 to a ninth multiplication unit input Min9 and subtracting an output of the second multiply circuit 430 from the sum. The second multiplication unit output Mout2 corresponds to a value obtained by subtracting the output of the first multiply circuit 420 from the ninth multiplication unit input Min9 and adding the output of the second multiply circuit 430 to the difference. The third multiplication unit output Mout3 corresponds to a value obtained by adding an output of the third multiply circuit 440 to a tenth multiplication unit input Min10 and adding an output of the fourth multiply circuit 450 to the sum. The fourth multiplication unit output Mout4 corresponds to a value obtained by subtracting the output of the third multiply circuit 440 from the tenth multiplication unit input Min10 and subtracting the output of the fourth multiply circuit 450 from the difference. In order to perform such a computation, the first arithmetic unit 460 includes first to sixth addition units 461 to 466. The first addition unit 461 subtracts the output of the second multiply circuit 430 from the output of the first multiply circuit 420. The second addition unit 462 adds the output of the fourth multiply circuit 450 to the output of the third multiply circuit 440. The third addition unit 463 adds an output of the first addition unit 461 to the ninth multiplication unit input Min9. The fourth addition unit 464 subtracts the output of the first addition unit 461 from the ninth multiplication unit input Min9. The fifth addition unit 465 adds an output of the second addition unit 462 to the tenth multiplication unit input Min10. The sixth addition unit 466 subtracts the output of the second addition unit 462 from the tenth multiplication unit input Min10.

The second butterfly circuit 470 receives eleventh to twentieth multiplication unit inputs Min11 to Min20 and outputs fifth to eighth multiplication unit outputs Mout5 to Mout8. The second butterfly circuit 470 has the same configuration as the first butterfly circuit 410, and thus a detailed description thereof will be omitted.

In order for the butterfly circuit 410 of FIG. 18 to perform a butterfly computation, a real number x1[R] and an imaginary number x1[I] of the first butterfly input x1 are input as the ninth and tenth multiplication unit inputs Min9 and Min10, respectively. A real number x2[R] of the second butterfly input x2 is input as the first and fifth multiplication unit inputs Min1 and Min5. An imaginary number x2[I] of the second butterfly input x2 is input as the third and seventh multiplication unit inputs Min3 and Min7. A real number w[R] of the twiddle factor w is input as the second and eighth multiplication unit inputs Min2 and Min8. An imaginary number w[I] of the twiddle factor w is input as the fourth and sixth multiplication unit inputs Min4 and Min6. When the inputs are applied in this way, the first multiplication unit output Mout1 corresponds to a real number of the first butterfly output y1. The second multiplication unit output Mout2 corresponds to a real number of the second butterfly output y2. The third multiplication unit output Mout3 corresponds to an imaginary number of the first butterfly output y1. The fourth multiplication unit output Mout4 corresponds to an imaginary number of the second butterfly output y2.

Figure 19:
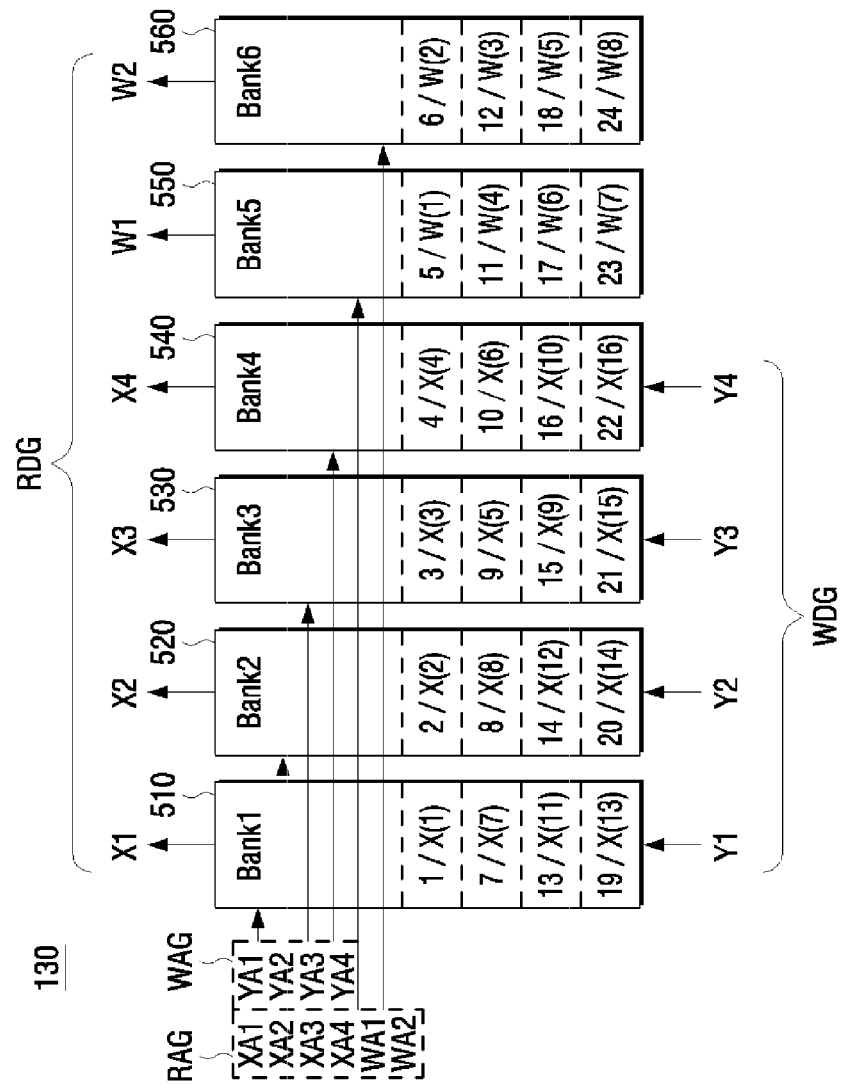

Referring to FIG. 19, the memory 130 has first to sixth banks 510 to 560. For example, the first to fourth banks 510 to 540 are dual-port memories and may simultaneously perform four outputs and four inputs. For example, the fifth and sixth banks 550 and 560 are single-port memories and may simultaneously perform two outputs.

The first to fourth banks 510 to 540 output first to fourth butterfly inputs X1 to X4 corresponding to first to fourth butterfly input addresses XA1 to XA4. The first to fourth banks 510 to 540 receive first to fourth butterfly outputs Y1 to Y4 corresponding to first to fourth butterfly output addresses YA1 to YA4. The fifth and sixth banks 550 and 560 output first and second twiddle factors W1 and W2 corresponding to first and second twiddle factor addresses WA1 and WA2.

The first to fourth butterfly input addresses XA1 to XA4 and the first and second twiddle factor addresses WA1 and WA2 correspond to the read address group RAG of FIG. 15. That is, the read address group RAG includes, as a plurality of read addresses, the first to fourth butterfly input addresses XA1 to XA4 and the first and second twiddle factor addresses WA1 and WA2. The first to fourth butterfly output addresses YA1 to YA4 correspond to the write address group WAG of FIG. 15. That is, the write address group WAG includes, as a plurality of write addresses, the first to fourth butterfly output addresses YA1 to YA4. The first to fourth butterfly inputs X1 to X4 and the first and second twiddle factors W1 and W2 correspond to the read data group RDG of FIG. 15. That is, the read data group RDG includes, as a plurality of pieces of read data, the first to fourth butterfly inputs X1 to X4 and the first and second twiddle factors W1 and W2. The first to fourth butterfly outputs Y1 to Y4 correspond to the write data group WDG of FIG. 15. That is, the write data group WDG includes, as a plurality of pieces of write data, the first to fourth butterfly outputs Y1 to Y4.

The memory 130 stores initial read data groups X(1) to X(16) and W(1) to W(8) in a predetermined order such that a collision between the plurality of banks 510 to 560 is avoided during the FFT computation. As an example, the initial read data groups X(1) to X(16) and W(1) to W(8), which are values stored in the memory 130 before the FFT computation, are stored by the controller 160. In the drawing, 1/X(1) indicates that X(1) is stored at address #1, and 5/W(1) indicates that W(1) is stored at address #5.

Generally, the 16-point FFT inputs X(1) to X(16) are stored in the sequential order of X(1), X(2), X(3), X(4), X(5), X(6), X(7), X(8), X(9), X(10), X(11), X(12), X(13), X(14), X(15), and X(16). However, according to this embodiment, the 16-point FFT inputs X(1) to X(16) are stored in a predetermined order of X(1), X(2), X(3), X(4), X(7), X(8), X(5), X(6), X(11), X(12), X(9), X(10), X(13), X(14), X(15), and X(16). As an example, the predetermined order is not sequential, but sequential in units of rows. That is, X(1) to X(4) are positioned in the 1st row, X(5) to X(8) are positioned in the 2nd row, X(9) to X(12) are positioned in the 3rd row, and X(13) to X(16) are positioned in the 4th row. The predetermined order is previously obtained through simulation so that a collision may be avoided between the banks 510 to 540 during the FFT calculation. Here, the collision between the banks 510 to 540 indicates that two or more of the first to fourth butterfly inputs X1 to X4 are simultaneously read by one bank. One bank may output only one butterfly input at a time. Accordingly, when two or more butterfly inputs must be read by one bank, normal operation becomes impossible. The simulation may be performed during a program compiling process. As an example, a complier checks whether a collision occurs between banks. When a collision has occurred, the predetermined order may be determined by repeating a process of exchanging positions of some of the initial FFT inputs X(1) to X(16).

Generally, the 8 twiddle factors W(1) to W(8) are stored in the sequential order of W(1), W(2), W(3), W(4), W(5), W(6), W(7), and W(8). However, according to this embodiment, the 8 twiddle factors W(1) to W(8) are stored in a predetermined order of W(1), W(2), W(4), W(3), W(6), W(5), W(7), and W(8). As an example, the predetermined order is not sequential, but sequential in units of rows. That is, W(1) and W(2) are positioned in the 1st row, W(3) and W(4) are positioned in the 2nd row, W(5) and W(6) are positioned in the 3rd row, and W(7) and W(8) are positioned in the 4th row. The predetermined order is previously obtained through simulation so that a collision may be avoided between the banks 550 to 560 during the FFT calculation.

Figure 20:
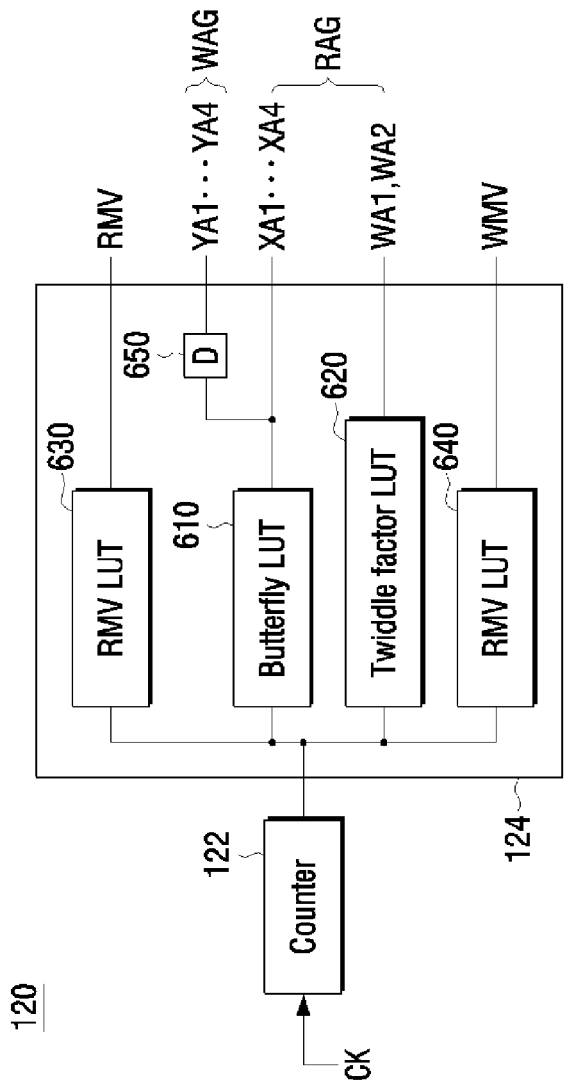

Referring to FIG. 20, the lookup table 124 of the address generator 120 includes a butterfly lookup table 610, a twiddle factor lookup table 620, a read mapping value lookup table 630, a write mapping value lookup table 640, and a register 650. As an example, the controller 160 inputs values required by the butterfly lookup table 610, the twiddle factor lookup table 620, the read mapping value lookup table 630, and the write mapping value lookup table 640 and then activates the counter 122.

The butterfly lookup table 610 outputs a plurality of butterfly input addresses XA1 to XA4 corresponding to an output value of the counter 122. The register 650 outputs a plurality of butterfly output addresses YA1 to YA4 obtained by delaying the plurality of butterfly input addresses XA1 to XA4 by one or more clock cycles. The delay performed by the register 650 corresponds to a delay time it takes from when a plurality of butterfly inputs X1 to X4 are output from the memory 130 until a plurality of butterfly outputs Y1 to Y4 are input to the memory 130. Although not explicitly shown in FIG. 15, it may take one or more clock cycles from when the plurality of butterfly inputs X1 to X4 are output from the memory 130 until the plurality of butterfly outputs Y1 to Y4 are input to the memory 130. By using values obtained by delaying the plurality of butterfly input addresses XA1 to XA4 as the plurality of butterfly output addresses YA1 to YA4, the plurality of butterfly outputs Y1 to Y4 are stored at positions where the plurality of butterfly inputs X1 to X4 were present in the memory 130.

The twiddle factor lookup table 620 outputs one or more twiddle factor addresses WA1 and WA2 corresponding to an output value of the counter 122. The read mapping value lookup table 630 outputs a read mapping value RMV corresponding to the output value of the counter 122. The write mapping value lookup table 640 outputs a write mapping value WMV corresponding to the output value of the counter.

FIG. 21 is a diagram showing values stored in the butterfly lookup table 610. Referring to FIG. 21, in the first cycle, the butterfly lookup table 610 outputs #1, #2, #3, and #4 as the plurality of butterfly input addresses XA1 to XA4. Accordingly, the memory 130 outputs X(1), X(2), X(3), and X(4) positioned at addresses #1, #2, #3, and #4 as the plurality of butterfly inputs X1 to X4. Since the plurality of butterfly input addresses XA1 to XA4 are also used as the plurality of butterfly output addresses YA1 to YA4, the plurality of butterfly outputs Y1 to Y4 are stored at the same addresses in the memory, that is, at addresses #1, #2, #3, and #4. In the second cycle, the butterfly lookup table 610 outputs #7, #8, #9, and #10 as the plurality of butterfly input addresses XA1 to XA4. Accordingly, the memory 130 outputs X(7), X(8), X(5), and X(6) positioned at addresses #7, #8, #9, and #10 as the plurality of butterfly inputs X1 to X4. Since the plurality of butterfly input addresses XA1 to XA4 are also used as the plurality of butterfly output addresses YA1 to YA4, the plurality of butterfly outputs Y1 to Y4 are stored at the same addresses in the memory, that is, at addresses #7, #8, #9, and #10. In this way, in the third cycle, the butterfly lookup table 610 outputs #13, #14, #15, and #16, and the memory 130 outputs X(11), X(12), X(9), and X(10). In the fourth cycle, the butterfly lookup table 610 outputs #19, #20, #21, and #22, and the memory 130 outputs X(13), X(14), X(15), and X(16). The subsequent operation is performed in the same manner as described above, and thus a description thereof will be omitted for convenience.

FIG. 22 is a diagram showing values stored in the twiddle factor lookup table 620. Referring to FIG. 22, in first to fourth cycles, the twiddle factor lookup table 620 outputs #5 and N/A as one or more butterfly input addresses WA1 and WA2. Here, N/A indicates that there is no output value. The memory 130 outputs W(1) positioned at address #5 as one or more twiddle factors W1. In the fifth cycle, the twiddle factor lookup table 620 outputs #5 and #18 as the one or more butterfly input addresses WA1 and WA2. The memory 130 outputs W(1) and W(5) positioned at addresses #5 and #18 as the one or more twiddle factors W1 and W2. The subsequent operation is performed in the same manner as described above, and thus a description thereof will be omitted for convenience.

FIG. 23 is a diagram for describing operation of the read mapper 140. Referring to FIG. 23, in the first cycle, the read mapper 140 maps a real number X2[R] of a second butterfly input X2 to a first multiplication unit input Min1, maps a real number W1[R] of a first twiddle factor W1 to a second multiplication unit input Min2, maps an imaginary number X2[I] of the second butterfly input X2 to a third multiplication unit input Min3, and maps an imaginary number W1[I] of the first twiddle factor W1 to a fourth multiplication unit input Min4. In this way, X2[R], W1[I], X2[I], W1[R], X1[R], X1[I], X4[R], W1[R], X4[I], W1[I], X4[R], W1[I], X4[I], W1[R], X3 [R], and X3 [I] are mapped to fifth to twentieth multiplication unit inputs Min5 to Min20, respectively. In the second cycle, the read mapper 140 maps X4[R], W1[R], X4[I], W1[I], X4[R], W1[I], X4[I], W1[R], X3[R], X3 [I], X2[R], W1[R], X2[I], W1[I], X2[R], W1[I], X2[I], W1[R], X1[R], and X1[I] to the first to twentieth multiplication unit inputs Min1 to Min20, respectively. The subsequent operation is performed in the same manner as described above, and thus a description thereof will be omitted for convenience.

Also, it is possible to reduce the complexity of the mapper by exchanging storage positions between data in the same row and making a change rule constant in the changed rows. Also, details about the changes of addresses corresponding to the changes of pieces of data in the same row among the mapping information may be incorporated into a read or write address memory (i.e., the butterfly lookup table 610 and the twiddle factor lookup table 620). The procedures and details of this process are determined and acquired through simulation.

FIG. 24 is a diagram for describing operation of the write mapper 150. Referring to FIG. 24, in the first cycle, the write mapper 150 maps a first multiplication unit output Mout1 to a real value Y1[R] of a first butterfly output Y1, maps a second multiplication unit output Mout2 to a real value Y2[R] of a second butterfly output Y2, maps a third multiplication unit output Mout3 to an imaginary value Y1[I] of the first butterfly output Y1, and maps a fourth multiplication unit output Mout4 to an imaginary value Y2[I] of the second butterfly output Y2. Also, the write mapper 150 maps fifth to eighth multiplication unit outputs Mout5 to Mout8 to Y3 [R], Y4[R], Y3[I], and Y4[I], respectively. In the second cycle, the write mapper 150 maps first to eighth multiplication unit outputs Mout1 to Mout8 to Y3[R], Y4[R], Y3[I], Y4[I], Y1[R], Y2[R], Y1[I], and Y2[I], respectively. The subsequent operation is performed in the same manner as described above, and thus a description thereof will be omitted for convenience.

The multi-functional computing apparatus and the FFT computing apparatus according to the present disclosure generates an address without the intervention of the controller because the address generator has a lookup table or a state machine, and thus it is advantages for reducing the load of the controller.

Also, the multi-functional computing apparatus and the FFT computing apparatus store data in a predetermined order such that collision is avoided between the plurality of banks, and thus it is advantageous for reducing required memory capacity.

The above embodiments and drawings attached to the present specification are merely intended to clearly describe part of the technical spirit included in the present invention, and it is apparent that all modifications and detailed embodiments that can be easily derived by those skilled in the art within the scope of the technical spirit included in the specification and the drawings of the present invention are included in the scope of the invention. As an example, according to this embodiment, an FFT computation using eight multiply circuits is illustrated by way of example. However, those skilled in the art will be able to apply the description to sixteen or more multiply circuits as well.

What is claimed is:

1. A multi-functional computing apparatus comprising:
a multiply-accumulate (MAC) unit having a plurality of MAC circuits;
an address generator configured to generate a read address group having a plurality of read addresses; and
a memory having a plurality of banks for storing a plurality of read data groups,
wherein the address generator delivers the generated read address group to the memory, and the memory delivers a read data group corresponding to the read address group selected from among the plurality of read data groups to the MAC unit, the read data group including a plurality of pieces of read data,
wherein the MAC unit further comprises an arithmetic unit configured to perform at least one arithmetic operation selected from among addition, subtraction, accumulation, and shifting on a plurality of outputs of the plurality of MAC circuits and output one or more MAC outputs obtained through the at least one arithmetic operation,
wherein when the multi-functional computing apparatus operates in a fast Fourier transform (FFT) mode, the read data group includes one or more twiddle factors and a plurality of butterfly inputs as the plurality of pieces of read data, a write data group includes a plurality of butterfly outputs as a plurality of pieces of write data, and a butterfly computation is performed by the MAC unit,
wherein the address generator comprises:
a counter configured to output a value changing based on clock;
a twiddle factor lookup table configured to output one or more twiddle factor addresses corresponding to the value;
a butterfly lookup table configured to output a plurality of butterfly input addresses corresponding to the value; and
a register configured to output a plurality of butterfly output addresses obtained by delaying the plurality of butterfly input addresses,
wherein the address generator delivers the one or more twiddle factor addresses and the plurality of butterfly input addresses to the memory as the plurality of read addresses and delivers the plurality of butterfly output addresses to the memory as a plurality of write addresses.

2. A multi-functional computing apparatus comprising:
a multiply-accumulate (MAC) unit having a plurality of MAC circuits;
an address generator configured to generate a read address group having a plurality of read addresses; and
a memory having a plurality of banks for storing a plurality of read data groups,
wherein the address generator delivers the generated read address group to the memory, and the memory delivers a read data group corresponding to the read address group selected from among the plurality of read data groups to the MAC unit, the read data group including a plurality of pieces of read data, wherein the MAC unit further comprises an arithmetic unit configured to perform at least one arithmetic operation selected from among addition, subtraction, accumulation, and shifting on a plurality of outputs of the plurality of MAC circuits and output one or more MAC outputs obtained through the at least one arithmetic operation, wherein when the multi-functional computing apparatus operates in a fast Fourier transform (FFT) mode, the read data group includes one or more twiddle factors and a plurality of butterfly inputs as the plurality of pieces of read data, a write data group includes a plurality of butterfly outputs as a plurality of pieces of write data, and a butterfly computation is performed by the MAC unit, wherein the MAC unit comprises first to fourth MAC circuits as the plurality of MAC circuits, wherein, the first MAC circuit multiplies a first MAC input and a second MAC input, the second MAC circuit multiplies a third MAC input and a fourth MAC input, the third MAC circuit multiplies a fifth MAC input and a sixth MAC input, and the fourth MAC circuit multiplies a seventh MAC input and an eighth MAC input, and wherein the arithmetic unit outputs first to fourth MAC outputs as the one or more MAC outputs, wherein the first MAC output corresponds to a value obtained by adding an output of the first MAC circuit to a ninth MAC input and subtracting an output of the second MAC circuit from the sum, the second MAC output corresponds to a value obtained by subtracting the output of the first MAC circuit from the ninth MAC input and adding the output of the second MAC circuit to the difference, the third MAC output corresponds to a value obtained by adding an output of the third MAC circuit to a tenth MAC input and adding an output of the fourth MAC circuit to the sum, and the fourth MAC output corresponds to a value obtained by subtracting the output of the third MAC circuit from the tenth MAC input and subtracting the output of the fourth MAC circuit from the difference.

3. The multi-functional computing apparatus of claim 2, wherein a real value of a first butterfly input among the plurality of butterfly inputs is delivered as the ninth MAC input, an imaginary value of the first butterfly input is delivered as the tenth MAC input, a real value of a second butterfly input among the plurality of butterfly inputs is delivered as the first and fifth MAC inputs, an imaginary value of the second butterfly input is delivered as the third and seventh MAC inputs, a real value of one of the one or more twiddle factors is delivered as the second and eighth MAC inputs, and an imaginary value of the twiddle factor is delivered as the fourth and sixth MAC inputs.

4. The multi-functional computing apparatus of claim 3, wherein the first MAC output corresponds to a real value of a first butterfly output among the plurality of butterfly outputs, the second MAC output corresponds to a real value of a second butterfly output among the plurality of butterfly outputs, the third MAC output corresponds to an imaginary value of the first butterfly output, and the fourth MAC output corresponds to an imaginary value of the second butterfly output.

* * * * *